United States Patent
Wilson

(10) Patent No.: US 11,606,198 B2
(45) Date of Patent: Mar. 14, 2023

(54) CENTRALLY MANAGED PKI PROVISIONING AND ROTATION

(71) Applicant: ValiMail Inc., San Francisco, CA (US)

(72) Inventor: Ashley Duane Wilson, San Francisco, CA (US)

(73) Assignee: ValiMail Inc., San Francisco, CA (US)

(*) Notice: Subject to any disclaimer, the term of this patent is extended or adjusted under 35 U.S.C. 154(b) by 165 days.

(21) Appl. No.: 17/154,968

(22) Filed: Jan. 21, 2021

(65) Prior Publication Data

US 2021/0226777 A1 Jul. 22, 2021

Related U.S. Application Data

(60) Provisional application No. 62/964,621, filed on Jan. 22, 2020.

(51) Int. Cl.
*H04L 9/08* (2006.01)
*H04L 9/32* (2006.01)

(52) U.S. Cl.
CPC ............ *H04L 9/083* (2013.01); *H04L 9/0825* (2013.01); *H04L 9/0847* (2013.01);
(Continued)

(58) Field of Classification Search
CPC ..... H04L 9/083; H04L 9/0825; H04L 9/0847; H04L 9/0861; H04L 9/0897; H04L 9/3263

See application file for complete search history.

(56) References Cited

U.S. PATENT DOCUMENTS

2010/0031042 A1* 2/2010 Di Crescenzo ............ H04L 9/32 713/168
2011/0138177 A1* 6/2011 Qiu ....................... H04L 9/3263 713/168

(Continued)

FOREIGN PATENT DOCUMENTS

WO WO 2020/011373 A1 1/2020

OTHER PUBLICATIONS

PCT International Search Report and Written Opinion, PCT Application No. PCT/US2021/014465, dated Apr. 27, 2021, 16 pages.
(Continued)

*Primary Examiner* — Techane Gergiso
(74) *Attorney, Agent, or Firm* — Fenwick & West LLP

(57) ABSTRACT

Embodiments relate to systems for distribution of cryptographic keys generated with high quality entropy on to new or configurable devices using a centralized entropy provider located at a server and a provisioning device that communicates between the server and the configurable devices. The server may receive a request from a provisioning device for a cryptographic keypair. For example, the provisioning device may be physically connected to a configurable device for bootstrapping and requests the identity keys to install on to the configurable device. The server generates the cryptographic keypair having newly generated public and private keys for the configurable device. The server encrypts the newly generated keypair (e.g., in the form of a private key and a certificate having the public key) using the public key of the provisioning device and transmits the encrypted keypair to the provisioning device for decryption and installation on to the configurable device.

20 Claims, 7 Drawing Sheets

(52) U.S. Cl.
CPC .......... *H04L 9/0861* (2013.01); *H04L 9/0897* (2013.01); *H04L 9/3263* (2013.01)

(56) References Cited

U.S. PATENT DOCUMENTS

| | | | | |
|---|---|---|---|---|
| 2011/0213957 | A1* | 9/2011 | Tsai | H04L 9/0825 |
| | | | | 713/153 |
| 2014/0281497 | A1* | 9/2014 | Medvinsky | H04L 9/006 |
| | | | | 713/156 |
| 2015/0095999 | A1* | 4/2015 | Toth | H04L 9/3263 |
| | | | | 726/6 |
| 2016/0028547 | A1* | 1/2016 | Yao | H04L 63/0807 |
| | | | | 713/176 |
| 2016/0285628 | A1* | 9/2016 | Carrer | H04L 9/321 |
| 2016/0373252 | A1 | 12/2016 | Goldstein | |
| 2016/0373257 | A1* | 12/2016 | Adrangi | H04L 9/006 |
| 2017/0295448 | A1* | 10/2017 | McCann | H04W 12/04 |
| 2018/0048632 | A1* | 2/2018 | Cammarota | H04L 63/0442 |
| 2018/0219679 | A1* | 8/2018 | Debois | H04L 9/321 |
| 2019/0097793 | A1 | 3/2019 | Nix | |
| 2019/0220611 | A1 | 7/2019 | Nix | |
| 2020/0021993 | A1* | 1/2020 | Yang | H04W 72/042 |
| 2021/0092603 | A1* | 3/2021 | Yang | H04W 12/122 |

OTHER PUBLICATIONS

Reed, D. et al., "The Technical Foundations of Sovrin, A White Paper" Sovrin Foundation, Sep. 29, 2016, 26 pages, [Online] [Retrieved on Apr. 14, 2021], Retrieved from the Internet<URL: https://sovrin.org/wp-content/uploads/2017/04/The-Technical-Foundations-of-Sovrin.pdf>.

\* cited by examiner

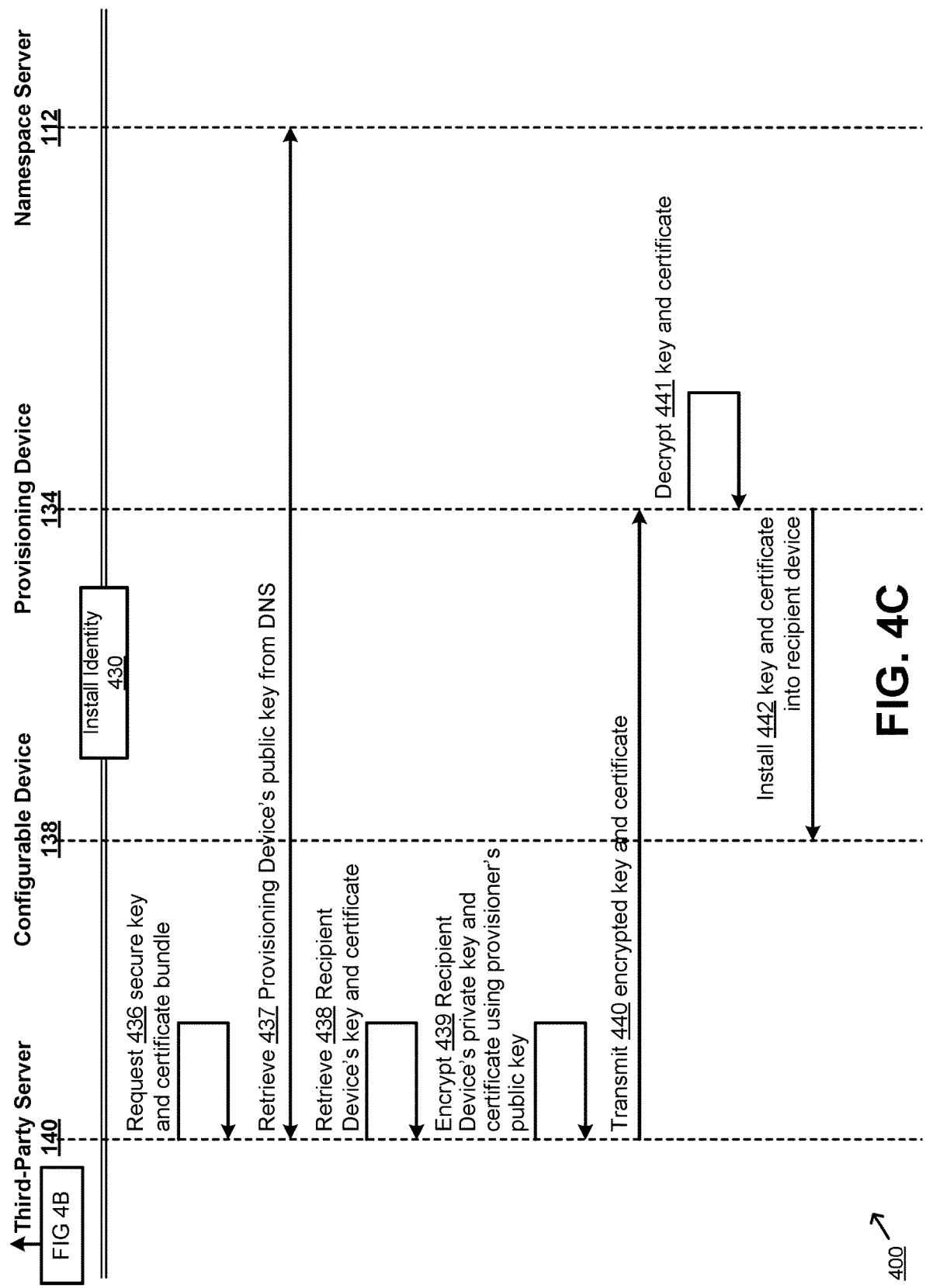

CENTRALLY MANAGED PKI PROVISIONING AND ROTATION

CROSS-REFERENCE TO RELATED APPLICATION

This application claims benefit to U.S. Provisional Patent Application No. 62/964,621, filed on Jan. 22, 2020, which is incorporated by reference herein for all purposes.

TECHNICAL FIELD

The present disclosure generally relates to device identity management and, more specifically, to centrally managed public key infrastructure (PKI) provisioning and rotation.

BACKGROUND

A truly randomized string of bits with a high entropy, a measure of unpredictability, is used for creating cryptographic keypairs for public-key authentication. In the absence of high quality entropy, private keys may be more easily derived and the security of confidential information is weakened. High quality entropy can be difficult to produce and may require specialized hardware. This specialized hardware may have high power consumption due to the complex processing required. General processors often use pseudorandom number generators such as the well-known linear feedback shift register to generate random bits, but whose bits are not truly randomized. Cryptographic keypairs generated by those pseudorandom bits are more vulnerable to attack. Hence, the process of configuring new devices, particularly specific-purpose devices such as Internet of things (IoT) devices, are often challenging because the devices may not be equipped with the specialized hardware to generate high quality private keys.

BRIEF DESCRIPTION OF THE DRAWINGS

Figure (FIG. 1 is a block diagram illustrating an example system environment, in accordance with some embodiments.

Figure 1:
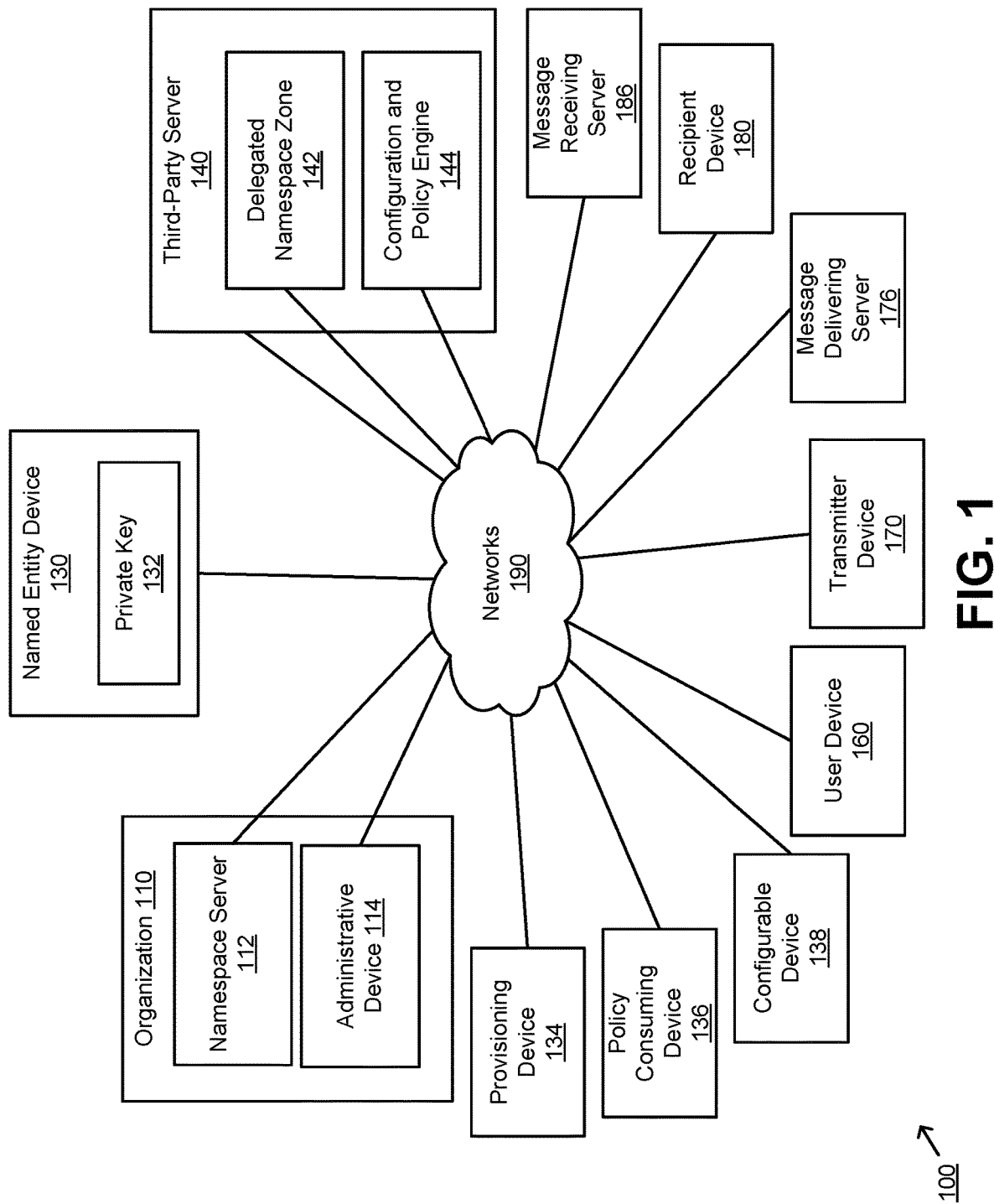

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview:

Embodiments described herein are related to an identity provisioning service that may be performed by a third-party server which is delegated to distribute cryptographic keypairs on behalf of one or more different organizations. The identity provisioning service may be used for installing identity onto new or configurable devices so that the devices may have keys generated with high quality entropy without needing local access to the specialized hardware needed for such entropy. Rather, the specialized hardware is locally remotely from the configurable devices on a server such as the third-party server for distribution over a network to authorized provisioning devices, which in turn are physically connected to the configurable devices.

The provisioning devices may transfer the identities generated with high quality entropy to new devices or rotate identities for devices whose keypairs are periodically updated. For example, an organization that is bootstrapping a device (e.g., a new device is being prepared for service within the organization by receiving identity keys) may use the identity provisioning service to install identity keys with high quality entropy in its configurable devices. In this way, the identity distribution service is a centralized managed PKI provisioning and rotation service whose high quality entropy generation is accessible by multiple devices that do not have, and similarly do not need, specialized hardware.

The provisioning devices may be peripheral devices operating under additional security policies to reduce security risks if they are lost, stolen, or otherwise compromised. In some embodiments, the third-party server maintains identity records and authorization policies associated with each of an organization's provisioning devices. The authorization policies may specify, among other rules or conditions, that the provisioning devices must provide a time-bound session token limiting the time during which the provisioning device is authorized to distribute generated keypairs for period of a time specified by the token. In this way, an organization is afforded time to deauthorize a compromised provisioning device. For example, the organization may remove or alter the identity record of the provisioning device to reflect its compromised state.

Example System Environment

Referring now to figure (FIG. 1, shown is a block diagram illustrating an example system environment 100 of a process delegation system in which an organization may delegate various tasks to a third-party server that is specialized in performing the tasks, in accordance with some embodiments. One of the tasks may be installing private keys or certificates on to new or configurable devices. Another task may be rotating the private keys or certificates on configurable devices. Yet another task may be to limit the authorization of a provisioning device to distribute keys to a predefined period of time based on a time-bound session token. The system environment 100 may include an organization 110, a named entity device 130, a third-party server 140 that performs various delegated tasks, a provisioning device 134, a policy consuming device 136, a user device 160, a transmitter device 170, a recipient device 180, and networks 190. In some embodiments, the system environment 100 may also include a message delivering server 176 and a message receiving server 186. In various embodiments, the system 100 may include different, additional or fewer components and entities. Also, in some implementations or situations, certain components' roles may overlap. For example, the named entity device 130 may serve as the policy consuming device 136, the user device 160, the transmitter device 170, message delivering server 176, the recipient device 180, or the message receiving server 186, depending on the situation. The functionalities of each element may be distributed differently among the elements in various embodiments.

While some of the components in the system environment 100 may at times be described in a singular form while other components may be described in a plural form, the system environment 100 may include one or more of each of the components. For simplicity, multiple instances of a type of entity or component in the system environment 100 may be referred to in a singular form even though the system may include one or more such entities or components. For example, in one embodiment, while the organization 110 and the named entity device 130 may be referred to in a singular form, the third-party server 140 may be a service provider that serves multiple organizations 110, each of which may be in communication with multiple named entity devices 130. Conversely, a component described in the plural form does not necessarily imply that more than one copy of the component is always needed in the environment 100.

An organization 110 may be any suitable entity such as a government entity, a private business, a for-profit organization or a non-profit organization. An organization 110 may define an environment in which a group of units, individuals, and devices organize and perform activities and exchange information. The system environment 100 may include multiple organizations 110, which may be customers of the third-party server 140 that delegate certain tasks to the third-party server 140. For example, an organization 110 may delegate the policy management and generation of policy recommendations to the third-party server 140.

An organization 110 has resources that are under its control. Example resources include a namespace server 112 and an administrative device 114. In some embodiments, some of the named entity devices 130, provisioning devices 134, configurable devices 138, and the policy consuming devices 136 may also be part of the organization's resources. For example, some of the named entity devices 130, provisioning devices 134, configurable devices 138, and policy consuming devices 136 may be controlled and operated by the organization 110.

In some embodiments, each organization 110 may be associated with its own namespace such as a domain (example.com). Some of the resources may be associated with a unique identifier under the namespace of the organization 110. For example, a device under the control of the organization having a domain example.com may have a DNS (domain name system) identifier (device1.example.com) for identification purposes. The device may be a named entity device 130, a provisioning device 134, a policy consuming device 136, or a combination thereof.

Figure 5:
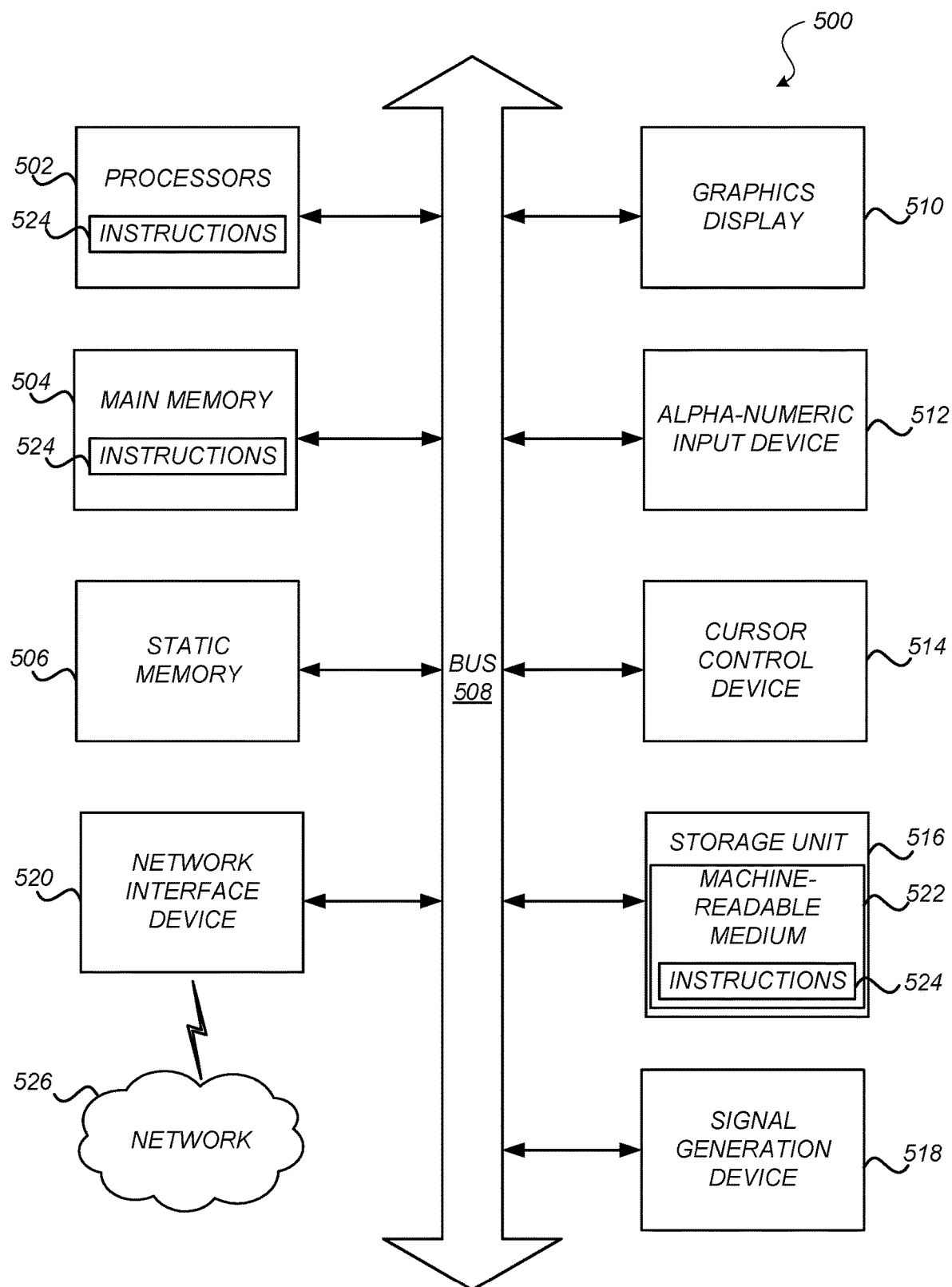
FIG. 5 is a block diagram illustrating components of an example computing machine, in accordance with some embodiments.

To manage its namespace, an organization 110 may include and control a namespace server 112. A namespace server 112 can be a domain owner DNS server. For example, an organization 110 may operate a BIND (Berkeley Internet Name Domain) server. Some or all of the components of a namespace server is illustrated in FIG. 5. The namespace server 112 for an organization 110 operates the namespace of the organization 110 (e.g., the domain of the organization 110), but may delegate a section of the namespace to the third-party server 140. For example, DNS is a distributed system that includes many parties working together to provide a cohesive namespace for the Internet. Starting from the root servers, each branch of the DNS is controlled by a party who may delegate sub-sections of the namespace to other parties. A namespace server 112 associated with an organization 110 may store DNS records for use in a DNS system, manage namespace for the domain name associated with the organization 110, delegate one or more sub-domains to other servers that can be authoritative, and answer queries about the namespace of the domain. A namespace server 112 may store multiple DNS records for a particular domain, such as an A record (address record), MX record (mail exchange record), and so on.

By way of example, an organization 110 named "Example Corp" that operates various devices (each may be an example of a named entity device 130 and/or a policy consuming device 136) may have a website located at www.example.com. The "com" portion of the namespace is maintained by a Top-Level Domain nameserver, which delegates (via a name server (NS) record) the management of the namespace "example.com" to Example Corp. Example Corp is responsible for maintaining the records under example.com, including www.example.com. Since the namespace may be many layers deep, Example Corp may organize its device identities under a specific branch of the DNS, such as "devices.example.com". A pattern for identifying devices by serial and model, organized under the namespace example.com, may be serial.model._devices.example.com, or 123.sensor._devices.example.com.

In some embodiments, an organization 110 may divide different branches of its namespace to different types of entities and devices. For example, natural persons may be under the namespace persons.example.com while devices are under the namespace devices.example.com. In another approach, the named entities may be assigned to a single branch, such as authentication.example.com. The wording used in the namespace can be arbitrary and does not always need to correspond to or have any relationship with the type of the named entity device 130.

DNS provides various types of records, including name-to-IP address resolution. DNS also has the ability to host specialized record types for public keys and certificates (DANE (DNS-based Authentication of Named Entities) or TLSA record type, RFC 6698). DKIM (Domain Keys Identified Mail) (RFC 6376) is another type of record that puts public keys in freeform TXT records.

An organization 110 may include one or more administrative devices 114 that manage the resources and namespace of the organization 110. Some or all of the components of an administrative device 114 is illustrated in FIG. 5. An administrative device 114 may be operated by an administrator, whether it is a robotic agent or a natural person. An administrative device 114 may manage identity records of named entity devices 130, provisioning devices 134, and policy consuming devices 136 that are associated with the organization 110. An administrative device 114 may also manage the configuration of various tasks that may be delegated to the third-party server 140, such as secure message distribution, encrypted device update distribution, namespace management, authentication services, policy management, policy recommendations and identity distribution, which may be performed by various engines discussed in further detail in FIG. 2. For example, an administrative device 114 may provide configuration settings to the third-party server 140 to allow the third-party server 140 to manage configurations on behalf of the organization 110 and recommend new or modified configurations to address changes in the application environment. An administrative device 114 may also change the settings associated with various components and resources in the organization 110.

An organization 110 may create an application environment for various participants to perform activities and interact with each other. The application environment in this context may be distinguished from software applications (software programs) that may also be mentioned in this disclosure. An application in this context may be a system that involves multiple participants that may authenticate and trust one another. The participants may perform certain common operations together and interact with each other. Certain actions may be autonomous or may be decided by individual participants, while other actions may be defined by the policies set forth by the organization 110. An individual participant may communicate with the third-party server 140, which is delegated by the organization 110 to manage the policies of the organization 110. Participants of an application may include named entity devices 130 and policy consuming devices 136. Some of the devices may serve both roles. Examples of application environments may include a distributed application with clients and servers, sensors and actuators, or cameras and recording systems. Other systems are also possible.

In the system environment 100, there can be multiple independent organizations 110, each of which may be in communication with various kinds of named entity devices 130. Various organizations 110 may be of different natures and provide different products and services to their customers. The organizations 110 may be customers of the third-party which operates the third-party server 140 and may delegate the third-party server 140 to perform different tasks to various extents. Each organization 110 may specify a different set of rules and policies when interacting with the third-party server 140 and in controlling how the third-party server behaves when performing the delegated tasks.

A named entity device 130 may be a device that is associated with a named entity that has one or more identity records on the Internet. The identity records are often stored and published in a namespace system such as DNS. An entity may be a natural person with a smartcard-based identity, a device with a private key, or an instance of an application, service, or microservice with a name in the DNS. The identity record may include the identity information of the named entity device 130 or a version of the identity (such as the hash of the identity) to preserve the privacy of the named entity associated with the named entity device 130. Examples of named entities may include natural persons (e.g., employees, outside contractors, administrators), properties, Internet of things (IoT) devices, equipment, machines, virtual objects, software applications, services, or any suitable objects or concepts that have names for identification. The named entity device 130 may be controlled manually by a person or autonomously by a machine.

By way of example, a named entity device 130 may be a roadside beacon (which may be an IoT device) with an identity record in a DNS zone. The roadside beacon may broadcast signed messages that provide warnings to autonomous vehicles of dangerous road conditions. In this case, an organization 110 may be a traffic regulating entity that also receives messages from the roadside beacon. In another example, a named entity device 130 may be a smart-home appliance that can automatically order an item from a retailer, which is another example of an organization 110. In a third example, a named entity device 130 may be a user device 160 that has a registered account with an organization 110. The implementations and use cases of the environment 100 are not limited to the explicit examples discussed in this disclosure.

Various named entity devices 130 may have different relationships with an organization 110 and may establish connections with more than one organization 110. In one example, a named entity device 130 may be made and operated by an organization 110. For example, an industrial organization may operate various sensors in a facility. The sensors may each be an IoT device that is an example of a named entity device 130. In the cases where a named entity device 130 is part of an organization's resources, the named entity device 130 may be associated with an identity record under the namespace of the organization 110. For example, the named entity device 130 may be associated with a unique identifier "123424.sensor._devices.example.com", controlled by the organization 110 Example Corp. In some cases, a named entity device 130 is not part of the organization 110 but may communicate with a policy consuming device 136 that is under the control of the organization 110 or that acts under one or more policies set forth by the organization 110. A named entity device 130 may be registered with the organization 110 and have one or more roles associated with one or more policies set by the organization 110. For example, a sensor may be registered with the organization 110 as an authorized sender to provide data to autonomous vehicles' computing devices (examples of policy consuming devices 136) that are controlled by or otherwise associated with the organization 110.

A named entity device 130 may have some or all of the components of an example computing device illustrated in FIG. 5. The types of components equipped in a named entity device 130 may vary, depending on its type. A named entity device 130 may be a server computer, a personal computer, a portable electronic device, a wearable electronic device, an IoT device (e.g., a sensor), smart/connected appliance (e.g., a refrigerator), dongle, etc. An IoT device may also be referred to as an Internet-connected device. The processing power of named entity devices 130 may vary and may be limited for certain types. For example, certain specialized IoT devices may be low-power devices that have limited processing power to reduce cost and power consumption. Certain specialized IoT devices may also be pre-programmed with certain computer code that enables the devices to communicate using certain communication protocols (e.g., Narrowband IoT or RFCOMM over Bluetooth, but not a complete TCP/IP stack). In some embodiments, some IoT devices may include a memory that can store a limited set of basic instructions, but may not have sufficient computing capability to dynamically determine context-specific policies for a given situation. Those devices may rely on the third-party server to perform computations dynamically for the devices.

In some embodiments, a named entity device 130 may include a private key 132 and a corresponding public key that are generated according to the PKI framework. The private-public key pair, also referred to herein as a "keypair," may be used to authenticate the named entity device 130. For example, the named entity device 130 may generate a digital signature by encrypting a message sent from the named entity device 130 using the private key 132. A party in communication with the named entity device 130 may authenticate the message sender using the public key of the named entity device 130. The private-public key pair may also be used to encrypt messages to be sent to the named entity device 130. For example, the message may be encrypted with the public key of the named entity device 130 and the device, upon receipt of the encrypted message, may use the private key to decrypt the message.

The public key may be saved in a publicly accessible source such as a namespace server (e.g., DNS). For example, the public key may be stored on the named entity device 130 and published in a namespace record (e.g., DNS record) at a location which may be referred to as the device identity name. In some embodiments, both the private key 132 and the corresponding public key are saved in the named entity device 130. The private key 132 may be saved in a hardware secure element of the named entity device 130 such as a trusted platform module (TPM). The hardware secure element safeguards the private key 132 and performs encryption and decryption functions. The hardware secure element may be a secure cryptoprocessor chip. In some embodiments, the safeguard of the private key 132 and the cryptographic functions may also be performed by software.

The third-party server 140 is a computing server that provides various services on behalf of the organization 110 and the named entity device 130. The third-party server 140 may also be referred to as a delegated server. The term "third-party" may be viewed from the perspective of the organization 110, which may delegate certain tasks and services to another company, which has the expertise to perform the tasks and services. For example, the organization 110 may be a customer of the third-party server 140. The services provided by the third-party server 140 may include managing policies for an organization 110, recommending new policies to an organization 110, authenticating responses on behalf of organizations 110, policy distribution on behalf of organizations 110, secure software distribution to named entity devices 130, secure information distribution to policy consuming devices 136, and other tasks that may include authentication and authorization of various named entity devices 130 and policy consuming devices 136, such as IoT devices. In one embodiment, an organization 110 may integrate certain processes or services provided by the third-party server 140 via an Application Programming Interface (API), which allows the third-party server 140 to inspect some of the messages directed to or in transit in the organization 110 and enables the third-party server 140 to apply various policies after receiving the messages. Some examples of services that may be performed by the third-party server 140 are discussed in further detail below with reference to FIG. 2.

Some or all of the components and hardware architecture of a third-party server 140 are illustrated in FIG. 5. The third-party server 140 may be a server computer that includes software that is stored in memory and one or more processors (general processors such as CPUs, GPUs, etc.) to execute code instructions to perform various processes described herein. The third-party server 140 may also be a pool of computing devices that may be located at the same geographical location (e.g., a server room) or be distributed geographically (e.g., cloud computing, distributed computing, or in a virtual server network).

The third-party server 140 may maintain a namespace zone 142 that is delegated by an organization 110. The namespace zone 142 may be referred to as a delegated namespace zone 142. The delegated namespace zone 142 may be a section of the namespace of an organization 110. The third-party server 140 provides management and maintenance of that section of the namespace. An example delegated namespace zone 142 may be a delegated DNS zone that is hosted by the third-party server 140 on behalf of the organization 110. For example, an organization 110 with the domain "example.com" may delegate the zone of "devices.example.com." to the third-party server 140 for the third-party server 140 to manage the identity records of certain devices of the organization 110. The delegated namespace zone 142 may include a database that stores identity records of various named entity devices 130.

While in this disclosure the namespace of an organization 110 is described using domain names as examples, other forms of the namespace are also possible. For example, the namespace may be in the form of a file path, XML, Java namespace, uniform resource name, network addresses (e.g., MAC addresses, IP addresses), and other suitable namespace formats. An organization 110 may also design a customized namespace. Various blockchains may also support different namespace formats and the namespace may be reserved for an organization 110 and recorded on a block of the blockchain.

The third-party server 140 may include a configuration and policy engine 144. The configuration and policy engine 144 may determine rules for various participants in an application environment and may also work with an enrichment engine to generate one or more new policy recommendations for the organization 110. The policy recommendations may be generated in the course of managing the operation of an application environment that is governed by the policies of the organization 110. The third-party server 140 may identify new devices and entities and automatically determine the potential rules that should apply to those new devices. A policy may be defined and initiated by an organization 110. An organization 110 may transmit the policy setting to or configure the policy setting at the third-party server 140. The configuration and policy engine 144 translates the policy setting to one or more interaction control lists to be distributed to various policy consuming devices 136. Interaction control lists may be a set of rules that define what devices are authorized to interact with a policy consuming device 136 and define how the policy consuming device 136 may behave in certain situations. The configuration and policy engine 144 may determine dynamically one or more context-specific policies that are applicable to a policy consuming device 136. The configuration and policy engine 144 may transmit the determined policies to the policy consuming device 136 as an interaction control list. The distribution of the interaction control list may be through a direct communication, such as a message payload to be sent to a policy consuming device 136, or via a namespace record. For example, the interaction control list, encrypted or not, may be posted on a DNS record for devices to download. To allow the third-party server 140 to communicate with a wide variety of devices, the interaction control list may be packaged in a well-known or standardized format.

A policy consuming device 136 may be a device associated with a policy consumer that consumes an interaction control list provided by the third-party server 140. A policy consumer is an entity that consumes policy from the third-party server 140. A policy consuming device 136 may be a named entity device 130, but may also be a device that is anonymous. Also, a policy consumer may be an entity under the direct control of an organization 110 or an entity managed by an unrelated party, with an identity in a managed namespace, like the DNS. The policy consumer may also be a member of the general public, and not represented by a specific named identity. A policy consumer may be the policy consuming device 136 itself, but may also be a part of the policy consuming device 136 that is anonymous. For example, a browser plugin may be a policy consumer that receives interaction control lists but does not have an identity.

Various policy consuming devices 136 may have different relationships with one or more organizations 110 in various situations. In one case, some of the policy consuming devices 136 may be part of the resources of an organization 110. For example, the organization 110 may be a sensor operator that controls a number of sensors in an application environment. In another case, a policy consuming device 136 may be a device whose management falls under a different organization 110 that is not the organization that operates the application environment. For example, an application environment of a podcast system may include a phone and an automobile as participants. The phone may be managed by a phone company and the automobile may be managed by a car manufacturer while the application environment may be managed by a third organization 110 that operates the podcast system. In yet another case, a policy consuming device 136 may be associated with multiple organizations 110 and participate in more than one application. For example, an autonomous vehicle may serve as a policy consuming device 136 that subscribes to a traffic light data service operated by a local government, to traffic and road condition data operated by a real-time traffic conditions provider, and to weather service operated by a private company. Each application environment (e.g., traffic light data, weather service) may have its own rules in terms of authentication and authorization on whether the autonomous vehicle may or may not receive or transmit certain data.

A provisioning device 134 may be enrolled by the organization 110 to become one of the policy consuming devices 136. In particular, the delegated namespace zone 142 may include an identity record of the provisioning device 134 and the configuration and policy engine 144 may generate an authorization policy for the provisioning device 134 to participate in the role of provisioning configurable devices 138 with newly generated keypairs. The provisioning device 134 may be a peripheral device that includes a security token or smart card configured with a memory to store identifying information (e.g., for key management), a physical interface (e.g., universal serial bus (USB) connector) for connecting to a configurable device, and a network interface for communication over the networks 190.

A provisioning device 134 may be a computing device having some or all of the components of an example computing device illustrated in FIG. 5. In some embodiments, the provisioning device 134 may exist as an emulator installed in a general computer and controllable by a human interface device (HID) like a keyboard, or a device which is capable of writing data directly to secure storage like a trusted platform module (TPM) or other secure element. The provisioning device 134 may be a general device without a dedicated processor for generating high entropy cryptographic keypairs. In this way, the provisioning device 134 may be a cost-efficient device that can be replaced more easily and whose authorization can be terminated if lost or stolen. The organization 110 operating the provisioning device 134 may rely on an entropy provider of the third-party server 140 to generate a high quality keypair and use the provisioning device 134 to securely bootstrap a keypair to a configurable device 138 to configure the configurable device's identity.

The configurable device 138 may be a device, such as an IoT device, whose identity needs to be configured. Examples of configurable devices 138 include newly manufactured devices whose identities have not been defined, repaired or refurbished devices, and operating devices whose identities are being replaced, such as in an identity rotation program. A configurable device 138 may be a computing device having some or all of the components of an example computing device illustrated in FIG. 5. In some embodiments, a configurable device 138 is a low-power or low-cost device that is not equipped with hardware or software that enables the configurable device 138 to directly communicate with a provisioning source wirelessly and securely. The configurable device 138 may need to be physically connected to the provisioning device 134 when the configurable device 138 is being provisioned. For example, in one embodiment, the configurable device 138 is designed in a way that its identity can only be provisioned by the physical connection.

The configurable device 138 may be one of the named entity devices 130 (i.e., a newly provisioned named entity device) after the provisioning device 134 has transferred the identity (e.g., a private key) of the configurable device 138 onto the configurable device 138. Additionally, once the identity provisioning process has been completed, the configurable device 138 or the provisioning device 134 may provide a notification to the third-party server 140, which may delete its local copy of the encrypted private key of the configurable device 138 for additional security. In some embodiments, the provisioning device 134 confirms that the private key was correctly installed on the configurable device 138 by using the public key of the configurable device 138 to confirm proof-of-possession. Provisioned configurable devices 138 may be used in various application environments such as serving as sensors in an IoT application.

The system environment 100 may also include character-specific devices such as a user device 160, a transmitter device 170, a message delivering server 176, a recipient device 180, and a message receiving server 186. Each of these devices may be a named entity device 130 and/or a policy consuming device 136.

A user device 160 is a computing device that may transmit and receive data via the networks 190. Some or all of the components of a user device 160 is illustrated in FIG. 5. The user device 160 also may be referred to as a client device or an end user device. Various user devices 160 may belong to different parties or may be associated with individual end users. Administrative devices 114, transmitter devices 170, and recipient devices 180 may also be examples of user devices 160. A user device 160 includes one or more applications and user interfaces that may communicate visual, tactile, or audio elements of the applications. The user devices 160 may be any computing devices. Examples of such user devices 160 include personal computers (PC), desktop computers, laptop computers, tablets (e.g., iPADs), smartphones, wearable electronic devices such as smartwatches, or any other suitable electronic devices.

A user may be personnel, an expert, an outside contractor, a customer, or otherwise an end user associated with an organization 110 or someone who is unrelated to any organizations 110. The user also may be referred to as a client or an end user and may control a named entity device 130. A user, through a user device 160, may communicate with other components in the system environment 100 in various suitable ways. For example, a user device 160 may include a user-side software application provided by an organization 110 or the third-party server 140. The user device 160 may interact with those components using a graphical user interface (GUI) of the software application. For example, an administrator (an example of a user) may specify the configurations of the authentication rules using a GUI of an application provided by the third-party server 140. An application may be a web application that runs on JavaScript or other alternatives. In the case of a web application, the application cooperates with a web browser to render a front-end interface. In another case, an application may be a mobile application. For example, the mobile application may run on Swift for iOS and other APPLE operating systems or on Java or another suitable language for ANDROID systems. In yet another case, an application may be a software program that operates on a desktop computer that runs on an operating system such as LINUX, MICROSOFT WINDOWS, MAC OS, or CHROME OS. In other cases, a user may communicate with the third-party server 140 by causing an administrative device 114 of an organization 110 to communicate directly to the third-party server 140, for example, via features such as Application Programming Interface (API) or like technologies such as webhooks. In other cases, a user device 160 may be a transmitter device 170 or a recipient device 180. For example, end users may send messages to each other and the messages may be authenticated through information provided by third-party server 140.

In the system environment 100, a transmitter device 170 and a recipient device 180 may be respectively the message transmitter and the message recipient. Messages are not limited to a particular type or format. Messages can be emails, text messages, instant messages, social media messages (e.g., FACEBOOK messages, posts, and TWEETS), RSS feeds, push notifications, Internet packets, data link frames, or any suitable data payloads. Messages may also include data or executable instructions such as software updates, firmware updates, and device configuration data or files. A message described in this disclosure does not always need to be a human-readable or machine-readable text string or communication. A message may also be information represented in a computer-readable form. A message may be a block of data, a payload, an executable set of instructions, human-written text, or any other suitable information that may be carried by one or more packets, data frames, or other suitable units of data, with or without control information, structured or unstructured, encrypted or not, and indexed or not. In some cases, if a message is sent from a named entity device 130, the message may bear the signature of the named entity device 130. Likewise, if a data payload is sent from the third-party server 140, the data payload may be transmitted with the signature of the third-party server 140 for authentication purposes.

Various transmitter devices 170 may be anonymous or may be named entity devices 130 whose identities are defined under different domains or sub-domains. A transmitter device 170 may be an example of named entity device 130 that is under the control of an organization 110. Messages sent from this transmitter device 170 may be authenticated based on the rules set by the organization 110. For transmitter devices 170 that are controlled by an organization 110 that has a domain, e.g., example.com, the identifiers of the transmitter devices 170 may be under the sub-domain such as devices.example.com, whose namespace may be delegated to the third-party server 140. Hence, when a recipient device 180 receives a message, the recipient device 180 may send an authentication query to the namespace server associated with the organization 110. The third-party server 140 may operate part of the namespace related to devices.example.com on behalf of the organization 110. In some embodiments, if a device is communicating with the third-party server 140, the third-party server 140 may also take the roles of transmitter device 170 and recipient device 180.

In some embodiments, a transmitter device 170 and a recipient device 180 may not transmit or receive messages directly through the networks 190. Instead, a message delivering server 176 and a message receiving server 186 transmit and receive messages on behalf of the devices. For example, in the setting of email communications, the message delivery server 176 sends emails on behalf of the transmitter device 170. The message delivery server 176 may include one or more computing systems, which may be configured similarly to the computing system described with reference to FIG. 5. As an example, the message delivery server 176 may be a mailing list server, a bulk mailer provider that sends emails on behalf of a domain, a transactional email system managed by a third-party that sends emails on behalf of a domain, or a security system that scans emails on behalf of a domain. The message delivery server 176 may send the email instead of the named entity device 130 so that the message delivery server 176 may provide additional processing or functionality to the email. In one embodiment, the email sender 114 uses standard mail protocols, such as Simple Mail Transfer Protocol (SMTP). SMTP supports various features. U.S. Pat. No. 9,762,618, entitled "Centralized Validation of Email Senders via EHLO Name and IP address Targeting," patented on Sep. 12, 2017, is incorporated by reference for all purposes. Likewise, in the setting of email communications, a message receiving server 186 may be an email server on the recipient end.

In the setting of IoT device communications, some IoT devices may be equipped with long-range communication capabilities such as LTE or 5G so that the devices can communicate with each other, with transmitter devices 170, and the third-party server 140 directly through the Internet. On the other hand, in some embodiments, some IoT devices may only be equipped with limited communication capability that is confined to a smaller area such as a local area network. In those cases, the IoT devices may rely on message brokers for the communications with transmitter devices 170 and the third-party server 140. In such cases, various message brokers may be examples of message delivering servers 176 and message receiving servers 186.

In various embodiments in this disclosure, for simplicity and unless otherwise specified, the communication between a transmitter device 170 and a recipient device 180 may be described as a message transmitter or a message originator transmitting a message to a message recipient. This description should include the situation where a transmitter device 170 directly sends a message to a recipient device 180 and the situation where a message delivering server 176 and a message receiving server 186 are involved (e.g., in the context of email communication). The authentication may be performed at the recipient device 180 and/or at the message receiving server 186. For simplicity, a message recipient may refer to a policy consuming device 136, a named entity device 130, a recipient device 180 or a message receiving server 186, depending on the situation and the communication protocol used in transmitting the message. A message recipient may also be referred to as an authenticator. Likewise, a message transmitter may refer to a named entity device 130, a transmitter device 170 or a message delivering server 176. In the context of policy consumption, a message transmitter may be a named entity device 130 and a message recipient may be a policy consuming device 136. If the message recipient transmits a second message to another recipient, the first message recipient may be referred to as a named entity device 130 and the second message recipient may be referred to as a policy consuming device 136.

The networks 190 may include multiple communication networks that provide connections to the components of the system environment 100 through one or more sub-networks, which may include any combination of local area and/or wide area networks, using both wired and/or wireless communication systems. In one embodiment, a network 190 uses standard communications technologies and/or protocols. For example, a network 190 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 190 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 190 may be represented using any suitable format, such as hypertext markup language (HTML), extensible markup language (XML), JavaScript object notation (JSON), structured query language (SQL). In some embodiments, all or some of the communication links of a network 190 may be encrypted using any suitable technique or techniques such as secure sockets layer (SSL), transport layer security (TLS), virtual private networks (VPNs), Internet Protocol security (IPsec), etc. The network 190 also includes links and packet switching networks such as the Internet. The network 190 may be any communication network that transmits data and signals by any suitable channel media such as wire, optics, waveguide, radio frequency, ID badge with a QR (quick response) code, infrared, or any suitable electromagnetic media. The network 190 may also be a direct communication between two devices. The network 190 can be in any topologies, such as point-to-point, star, mesh, chain, bus, ring, and any other suitable, regular or irregular, symmetric or not, cyclic or acyclic, fixed or dynamic (e.g., certain devices moving) topologies.

Example Third-Party Server

Figure 2:
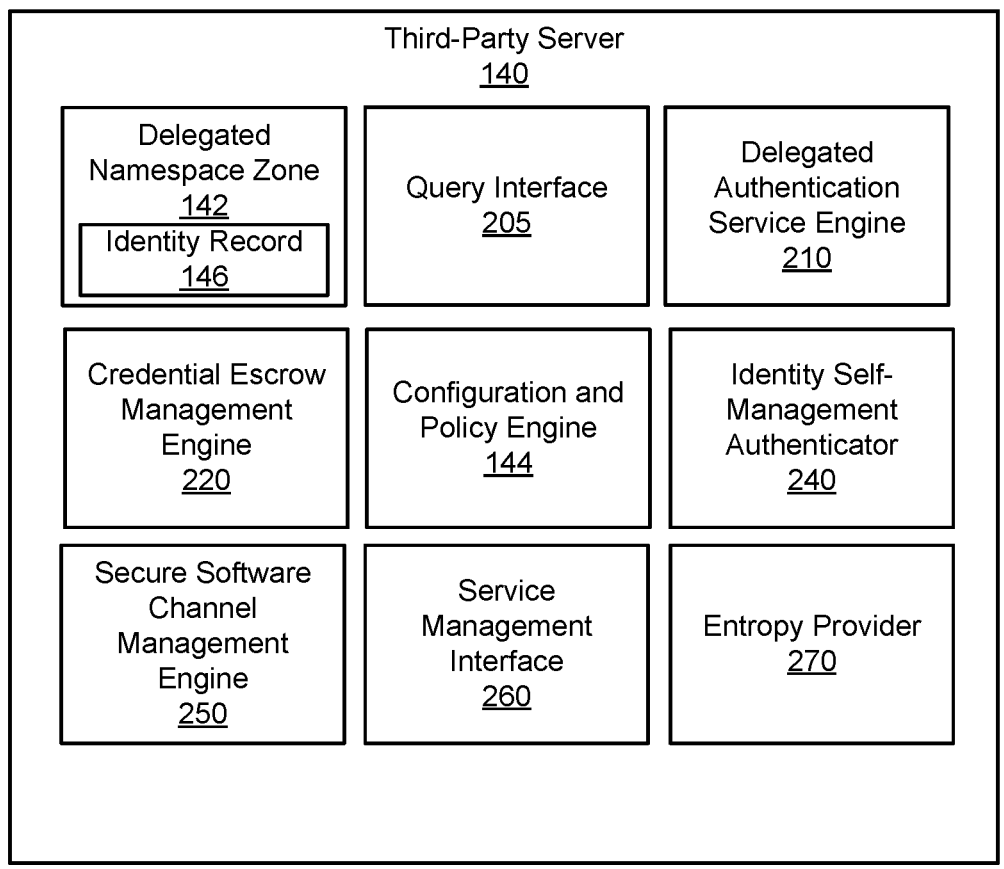
FIG. 2 is a block diagram illustrating various components of an example third-party server, in accordance with some embodiments.

FIG. 2 is a block diagram illustrating an example third-party server 140, in accordance with some embodiments. In some embodiments, the third-party server 140 may include a delegated namespace zone 142, a query interface 205, a delegated authentication service engine 210, a credential escrow management engine 220, a configuration and policy engine 144, an identity self-management authenticator 240, a secure software channel management engine 250, a service management interface 260, and an entropy provider 270. In various embodiments, the third-party server 140 may include fewer or additional components, depending on the functionalities of the third-party server 140 in various embodiments. For example, if the third-party server 140 does not perform credential escrow service, the third-party server 140 may not include credential escrow management engine 220. The third-party server 140 also may include different components. The functions of various components in third-party server 140 may be distributed in a different manner than described below. Moreover, while each of the components in FIG. 2 may be described in a singular form, the components may present in plurality.

The components of the third-party server 140 may be embodied as software engines that include code (e.g., program code comprised of instructions, machine code, etc.) that is stored on an electronic medium (e.g., memory and/or disk) and executable by one or more processors (e.g., CPUs, GPUs, other general processors). The components also could be embodied in hardware, e.g., field-programmable gate arrays (FPGAs) and/or application-specific integrated circuits (ASICs), that may include circuits alone or circuits in combination with firmware and/or software. Each component in FIG. 2 may be a combination of software code instructions and hardware such as one or more processors that execute the code instructions to perform various processes. Each component in FIG. 2 may include all or part of the example structure and configuration of the computing machine described in FIG. 5.

The third-party server 140 may be a computing server that provides various services and performs different tasks on behalf of multiple unrelated organizations 110. Each organization 110 may delegate a section of the organization's namespace to the third-party server 140 as the delegated namespace zone 142. The delegated namespace zone 142 may be used for authentication and authorization. The delegated namespace zone 142 may correspond to a delegated DNS server, a blockchain server, a distributed database server, a publicly accessible server, another suitable server, or any combination of those servers. If the delegated namespace zone 142 is a delegated DNS, the third-party server 140 is trusted because of the delegated nature of managing DNS zones. Also, the records in DNS may be cryptographically signed to ensure that the records are authoritative and have not been tampered with. If the delegated namespace zone 142 is a namespace under a blockchain, the delegated namespace zone 142 is trusted because the records are tamper-evident.

In various embodiments, the delegated namespace zone 142 may include one or more of the following traits: (1) authenticated (2) delegated and/or (3) able to handle arbitrary content. DNS is one example of such a database. First, DNS allows the known entity to manage its own records within the database. Second, DNS enables hierarchical delegation via NS records so that the known entity can provide others authenticated access with permission on its behalf of a subset of the database. For example, an Example Corp is responsible for maintaining all the records under example.com, including www.example.com. Because the namespace may be many layers deep, Example Corp may wish to organize its device identities under a specific branch of the DNS, such as "devices.example.com". Example Corp may delegate the sub-domain to any party, such as the third-party server 140. Third, arbitrary data, such as text-based, encrypted or not, data can be stored in DNS records. In addition to name-to-IP address, DNS can host specialized record types for public keys and certificates (DANE/TLSA, RFC 8698), and DKIM (RFC 8376), which puts a public key in a freeform TXT record. In some embodiments, encrypted data that is encrypted with the public key of a named entity device 130 may be included in a DNS record for the named entity device 130 to retrieve.

In some embodiments, the delegated nature of a namespace system may allow organizations 110 such as Example Corp to delegate special-purpose parts of their namespace (e.g., DNS hierarchy) to a specialized third-party service provider (3PSP), such as the third-party server 140. For instance, Example Corp may delegate a section of its DNS tree (e.g. "devices.example.com") to the third-party server 140. The namespace falls under example.com, which may be hosted on computing servers owned by Example Corp, but the devices.example.com section of the namespace may be delegated by Example Corp to be hosted on the infrastructure of the third-party server 140 as the delegated namespace zone 142.

Although the discussion focuses on the use of DNS as the example distributed database, systems other than DNS may also be used. For example, the Inter-Planetary File System ("IPFS") may also be used. A third alternative example is a blockchain platform supporting application code submissions. While the discussion in this disclosure may focus on the use of DNS for the database, the systems and processes described can be applied to other namespace contexts and implementations. For the rest of the disclosure, even though the descriptions may focus on the DNS, other namespace systems may also apply in a similar manner unless specified otherwise.

The delegated namespace zone 142 may include a plurality of identity records 146. An identity record 146 may be a record that corresponds to a named entity device 130. An identity record 146 may include a unique identifier of a named entity device 130 (e.g., a name), authentication context information, and/or any information that may be used to authenticate the named entity device 130 or verify certain information associated with the named entity device 130. In some embodiments, the identity record 146 may include information that is signed by the private key 132 of the named entity device 130 so that the signer of the information can be easily verified by the device's public key.

While identity records 146 are sometimes discussed in this disclosure with the examples of identifiers or contextual information, the identity record 146 does not need to include any of those examples and may include other types of information that may be directly related to the identity of the named entity device 130. Each organization 110 may include many identity records and may provide a set of those records to the third-party server if the organization 110 decides that the named entity devices 130 corresponding to those provided records should be discoverable.

A unique identifier, which may be part of an identity record 146, may be used to identify a named entity device 130 and may be used as a record locator for retrieving the named entity's credential, other contextual authentication information, or other identity information related to the named entity device 130. In some embodiments, an identifier may be in a format under the namespace of the organization 110. An example identifier can be 123.sensor.devices.example.com. In other embodiments, the identifier may also be any text string, arbitrary or not. In some embodiments, the identity records 146 may be saved as key-value pairs in which the identifiers serve as the keys, and the other information are the values. Other formats (e.g., tabular, CSV, tab delimiter, XML, JSON) to store the identity records 146 are also possible.

The query interface 205 may be a communication interface for the third-party server 140 to communicate with various devices in the system environment 100, such as the named entity device 130, the policy consuming device 136, the user device 160, etc. A device may transmit a query to the third-party server 140. The queries may inquire about different kinds of information such as available software or firmware update, device configuration settings, other device updates, policies and interaction control lists, authentication information, authorization information, confidential messages, private messages, or other information. In response, the third-party server 140 may provide encrypted data payloads as the responses to the devices. The encryption may achieve object security so that encryption can be different even for the same data payload. In some embodiment, the same data payload sent to the same device may also be encrypted differently for each occasion. For example, for each query, the third-party server 140 may generate a different random symmetric key to encrypt the data payload. The symmetric key may be encrypted by the public key of the device making the query.

By way of example, the third-party server 140 may receive a query from a device via the query interface 205. The query may include a subscriber identifier of the device. The third-party server 140 may store confidential information that includes an association between the subscriber identifier and a public key of the device. The confidential information is generally not revealed to the public. The third-party server 140 may store the public key directly or may store the identity address of the device. For example, the identity address may be the device's DNS address that stores the device's public key. The third-party server 140 may determine, from the confidential information, an association between the subscriber identifier and the public key of the device. The third-party server 140 may retrieve the public key of the device. In response to the query, the third-party server 140 may generate a data payload. In turn, the third-party server 140 may encrypt the data payload by a symmetric key that is generated randomly. The third-party server 140 also encrypts the symmetric key by the public key of the device. The third-party server 140 transmits the encrypted data payload and the encrypted symmetric key to the device via the query interface 205. The device uses its private key to decrypt the symmetric key. The symmetric key is then used to decrypt the encrypted data payload.

The query interface 205 may serve to anonymize the identities of organizations 110 and devices. For example, the third-party server 140 may serve as a centralized server for the distribution of various messages on behalf of different organization customers. The query interface 205 may have the same address for various organizations 110 for various devices to send queries of different purposes to the same address. The query may be encrypted using the public key of the third-party server 140 so that the third-party server 140 may determine a proper response to the query based on the query content and the metadata of the query. For example, the query may specify the intended recipient of the query is an organization 110 but the intended recipient information is encrypted. In such a case, the organization 110 can be anonymized and the address of the query interface 205 will not reveal the identity of the organization 110 because the organization has delegated the message response task to the third-party server. In some embodiments, the third-party server 140 may provide a specific address of the query interface 205 for a particular organization 110. The address may be under the namespace of the Internet domain of the organization 110 and is delegated to the third-party server 140. While, in this case, the address may reveal the identity of the organization 110, the communication between the third-party server 140 and a device may be encrypted. For example, the messages from the third-party server 140 may be encrypted by different symmetric keys so that the nature of the communication is untraceable.

The query interface 205 may take various forms. For example, in some embodiments, the query interface 205 takes the form of an API such as REST (representational state transfer), SOAP (Simple Object Access Protocol), RPC (remote procedural call), or another suitable type. In some embodiments, the query interface 205 may be a namespace server such as a DNS server. In some embodiments, the query interface 205 may be a network routing node or a packet switching node. Other types of network interface may also be used as the query interface 205.

The third-party server 140, through the delegated authentication service engine 210, may provide the delegated authentication service on behalf of an organization 110. The delegated authentication service engine 210 may perform different authentication-related services, including providing authentication responses to message recipients for communications between two devices, contextual authentication, and certain authentication on behalf of some message recipients. On behalf of an organization 110, the third-party server 140 may receive an authentication query from a message recipient. The authentication query may include certain metadata of the message or an identifier of the transmitter, which claims to be associated with an organization 110. The identifier in the authentication query may be the same as an identifier stored in an identity record 146 or may include metadata that allows the third-party server 140 to retrieve the identifier stored in the identity record. In response, the third-party server 140, as an operator of the delegated namespace zone 142, provides the identity record 146 or part of the identity record 146 to the message recipient as the authentication response.

An authentication query may be transmitted from a message recipient, which receives a message purportedly sent from a named entity associated with an organization 110. If the third-party server 140 operates as part of a DNS server, the authentication query may be a DNS query. If the third-party server 140 operates as other types of servers such as a blockchain server, the query may be in other suitable formats. For example, in an embodiment where a blockchain is used, the third-party server 140 may include an oracle machine to provide information to a smart contract saved in the blockchain for the generation of the authentication response. Other implementations are also possible.

On behalf of the organization 110, the delegated authentication service engine 210 may also provide services related to authentication using context information. The third-party server 140 may receive authentication context configurations from various organizations 110. Each organization 110 may have a different setting on the authentication context. The third-party server 140 may translate the authentication context configuration information to a formatted DNS record and publish the record as a resource record under the sub-domain. DNS allows the publication of multiple resource records under the same name. Each organization 110 may manage its own authentication context information and settings via an API or an application provided by the third-party server 140, such as through the service management interface 260. The third-party server 140 translates the authentication context information and settings into namespace records (e.g., DNS records) for publication.

The delegated authentication service engine 210 may use time-bound session tokens for authenticating provisioning devices 134. The third-party server 140 may generate and publish encrypted time-bound session tokens in the delegated namespace zone 142, where the third-party server 140 encrypts the published token using the public key of a provisioning device 134. In some embodiments, a configurable device 138 whose identity has already been installed (e.g., using a provisioning device 134) may access the encrypted time-bound session tokens as well, in which case the encryption would be done by the third-party server 140 using the public key of the configurable device 138.

The provisioning device 134 or configurable device 138 may have a record (e.g., the identity record 146) where the time-bound session token is stored. The identity record 146 may be populated when a newly generated keypair is available for download. When the provisioning device 134 or configurable device 138 detects a time-bound session token is present in the delegated namespace zone 142, the device may replace the configurable device's existing private key with the private key downloaded from the third-party server 140. Likewise, the third-party server 140 may replace its record of the public key of the configurable device with the newly generated public key.

In some embodiments, the provisioning device 134 or configurable device 138 may transmit a notification to the third-party server 140 that the keypair has been rotated. In response to receiving this notification, the third-party server 140 may delete the encrypted private key and the time-bound session token from its storage. In some embodiments, the third-party server 140 determines that the credential rotation has been completed in response to detecting that the public key of the configurable device 138 stored in the identity record 146 has changed, and then deletes the private key and time-bound session token from its storage. The third-party server 140, after detecting that the public key of the configurable device 138 stored in the identity record 146 has changed, may generate a new certificate with the updated public key for publishing to the namespace server 112, thereby replacing the public key on the namespace server 112.

Optionally, secure hyper-text transfer protocol (HTTPS) may be used with the encrypted time-bound session token stored in the delegated namespace zone 142. This may provide an audit trail for key retrieval.

Authentication context information may include credentials (e.g., one or more public keys or another suitable authentication credential of a named entity device 130) and contextual metadata (such as time, location, etc.) that may be needed for a message recipient to authenticate a message purportedly transmitted from the named entity device 130, and other information needed for the authentication. Authentication context information may also be an example of a type of identity records 146. The format of the authentication context information may depend on the type of messages being transmitted. For example, in the context of emails, the format may be in compliance with one or more established standards such as SPF (Sender Policy Framework), DKIM (DomainKeys Identified Mail), DANE (DNS-based Authentication of Named Entities). In other contexts, the format may be in compliance with other protocols that are in various layers such as the application layer, transport layer, or Internet layer. A message recipient may send an authentication query. Upon the right conditions under the rules specified by the named entity device 130, the third-party server 140 provides the message recipient with the authentication context information.

Complexity in communications arises from the contexts constraining the communications. Besides verifying the credential, a message recipient may also verify other contexts. Examples of such contexts may include time (now, not later), location (here, not there), directionality (one way or two way), means (e.g. mobile phone not email), sequencing (in a chain of communications, whether order matters or not), topology (one-to-one, one-to-many, many-to-one), modifiability (whether the communications can be modified), modifications (whether the modification are they allowed), and form of ID (the primary authenticated key into the database, for DNS this is a domain, for other datastores such as IPFS and blockchain, the keys are different). Non-substantive constraining context or limitations to the communications may be managed by the third-party server 140. Further examples of contexts include amplification, aggregation, summarization, shelf life, and revocation. Another example is a computationally intensive context—one requiring specific software developed and installed to perform these computations.

Authentication context settings, which may be provided by an organization 110 and managed by the third-party server 140, may specify what type of information will be provided and how the third-party server 140 should respond when an authentication query is received. For example, in one setting, an organization 110 may specify that a named entity's public key will be forwarded when an authentication query is received. In another example, an organization 110 may specify additional context information (e.g., time, location) for the third-party server 140 to forward. In yet another example, an organization 110 may allow the third-party server 140 to perform certain authentication processes on behalf of a message recipient, such as in a circumstance where the message recipient is a device that may lack the general processing power to perform certain authentication. In yet another example, an organization 110 may require the third-party server 140 to perform authentication of the message recipient before its own name entity's authentication context information is forwarded.

In some embodiments and based on the setting of an organization 110, authentication may be mutual. The third-party server 140 may authenticate the message recipient before any authentication context information is forwarded to the message recipient for the recipient to authenticate the message that is purportedly transmitted under the domain of the named entity device 130. The third-party server 140 may verify the digital signature of the message recipient that may be included in an authentication query.

In some embodiments, the delegated authentication service engine 210 may perform part of the authentication process on behalf of a message recipient. Communications among certain types of IoT devices may be an example that may utilize this feature. Certain IoT devices may be sensors or other devices that have limited processing power. They may include a hardware circuit for decrypting and encrypting cryptographic keys and have limited processing powers designed for performing certain limited actions as a sensor. Those IoT devices may be message recipients that receive information from a beacon that broadcasts the message over radio waves in the vicinity. In some cases, a malicious party may record the broadcast of a message and playback at another location in an attempt to manipulate IoT devices that are not the intended recipients. An IoT device, upon receiving the message, may transmit an authentication query to the third-party server 140. An organization 110 may specify that the third-party server 140 can authenticate the message on behalf of certain devices. For example, the third-party server 140 may verify the location information metadata (an example of contextual evaluation) of the sending location of the message in order to confirm that the message was sent from a legitimate beacon. The third-party server 140 may transmit a response that includes the public key of a named entity device 130 (e.g., the message transmitter) and contextual evaluation result over the Internet that may include DNSSEC (Domain Name System Security Extensions) and TLS (Transport Layer Security) to ensure the response is securely delivered to the IoT device.

The configuration and policy engine 144 may determine rules for various participants in an application environment. A policy may be defined and initiated by an organization 110. An organization 110 may transmit the policy setting to, or build the policy at, the third-party server 140. The configuration and policy engine 144 translates the policy to one or more configurations, whether generated automatically based on the policy requirement or generated partially manually through a guided workflow.

The configuration and policy engine 144 may determine dynamically one or more context-specific policies that are applicable to a policy consuming device 136. The configuration and policy engine 144 may transmit the determined policies to the policy consuming device 136 as an interaction control list. Interaction control lists may be a set of rules that define what devices are authorized to interact with a policy consuming device 136 and define how the policy consuming device 136 may behave in certain situations. The distribution of the interaction control list may be through direct communication, such as a message payload to be sent to a policy consuming device 136, or via a namespace record. For example, the interaction control list, encrypted or not, may be posted on a DNS record for devices to download. To allow the third-party server 140 to communicate with a wide variety of devices, the interaction control list may be packaged in a well-known or standardized format.

A policy may include various elements that define the policy settings in an application environment. In one example, elements of a policy may include roles, members, and rules. A role defines a type of participant in the application environment. For example, a type of sensor may assume a certain role in an autonomous vehicle application environment. A role may include a collection of members and rules. The role provides a logical container for how similar members should interact. A member is a participant in an application environment. A member may be a named entity device 130 or a policy consuming device 136. Continuing with the example of a role being a type of sensor, members under the role may be individual sensors that are located in various locations of the application environment. A rule is a description of how members of a role are authorized to interact. For instance, members of a first role may accept certain communications from members of a second role, but not a third role. A rule may also define the format of information accepted by a destination member. A rule may offer granular control over certain field values, such as various values of parameters, metrics, and metadata. A rule may be a feature of a particular role, but may also be a feature of the broader application. The details of the policy may be translated into various configurations in order for the policy to be achieved.

An interaction control list may be a version of a policy and may include relevant data that is packaged in an appropriate format (e.g., a well-known or standardized format) for a policy consuming device 136 to consume. An interaction control list may be derived from a policy, whether the control list is filtered or not, converted or not, combined or not. For example, a policy consuming device 136 may receive a message from a named entity device 130. While the named entity device 130 may be authenticated, the policy consuming device 136 may need to determine whether it is authorized to communicate with the named entity device 130. In turn, the policy consuming device 136 may query the third-party server 140. The configuration and policy engine 144 may determine the role of the named entity device 130 and generate a customized interaction control list for the policy consuming device 136. The interaction control list may include a list of authorized named entities with which the policy consuming device 136 is authorized to communicate. The interaction control list may be filtered from the larger policy and may include data that is relevant to the particular policy consuming device 136.

The interaction control list may take different forms. For example, an interaction control list may be a communication policy or protocol that defines how an IoT device may communicate with other devices generally or in specific situations. An interaction control list may also take the form of a set of instructions that may define or alter the behavior of a device. The policy may also take the form of a policy plugin that may enable a device with the plugin to behave in a standard way or be compliant with a standard. In yet another example, an interaction control list may include key-value pairs that include a list of authorized named entity devices 130 and other parameter values that are saved using the parameter name as the key. An interaction control list may use well-known formats such as JSON, XML, but may also in a standardized format that is yet to be developed in the future by an industry that deploys various application environments.

The credential escrow management engine 220 may store confidential credentials (e.g., username and password) of named entity devices 130 and manages the credentials on behalf of the devices 130. In some cases, certain named entity devices 130 may not be complex enough to include the hardware and software (or simply it is too costly to include those secure elements) to safeguard certain confidential credentials, such as text-based credentials that may be used as the API credentials to communicate with an API of the organization 110. Instead of storing the credentials in each named entity device 130, an organization 110 may deposit the credentials of devices 130 that are registered with the organization 110 to the credential escrow management engine 220. The credential escrow management engine 220 may store an association among (1) the identifier of the named entity device 130 saved in the DNS record associated with the device 130, (2) the named entity device's API key identifier (e.g., API username, which may or may not be the same as the identifier in the DNS record), and (3) the device's API secret key (e.g., API password). In some embodiments, the association may also include the named entity device's public key. In one embodiment, to enable the named entity device 130 to communicate with the API, the credential escrow management engine 220 may provide an ephemeral credential (e.g., a session token) for a named entity device 130 to communicate with the API. This limits the exposure of a compromised named entity device 130.

By way of example, the credential escrow management engine 220 may provide a credential of a named entity device 130 to the organization's API to perform the initial authentication on behalf of the device. A named entity device 130 that intends to initiate a communication with the API may provide a request to the third-party server 140. The request may include an identifier of the named entity device 130, such as the identifier in the DNS record of the named entity device 130. In response, the credential escrow management engine 220 may provide the named entity device's API credential (in escrow of the third-party server 140) to the API. The API, upon authenticating the credential, may generate an ephemeral credential such as a session token for the named entity device 130 to establish a communication session with the API. The API may transmit the ephemeral credential to the third-party server 140. The credential escrow management engine 220 may transmit a query to a DNS (or another namespace system) that includes the DNS record of the named entity device 130. The DNS record may include the public key of the named entity device 130. The credential escrow management engine 220 may use the public key to encrypt the ephemeral credential. The credential escrow management engine 220 may publish a namespace record (e.g., DNS record) at the namespace associated with the organization 110. The namespace record contains the encrypted ephemeral credential for the named entity device 130 to retrieve the ephemeral credential at the namespace system. The namespace record may also include a time to live entry that corresponds to a lifetime of the session token. Upon retrieval, the named entity device 130 may use its private key to decrypt the encrypted ephemeral credential. While in this disclosure the credential for API is often described as a time-bound credential, in some embodiments the encrypted credential may also be non-time-bound. For example, the distribution of the credentials may include the distribution of text-based credentials from the third-party server 140 to a named entity device 130. Some APIs do not support the use of a time-bound session token and rely on key/secret credentials (e.g., username/password). The credentials may be stored in the third-party server 140 and may be sent to the named entity device 130 on demand.

The identity self-management authenticator 240 may perform authentication for the self-rotation of certificates. The identity of a named entity device 130 may be asserted by using the private key to decrypt a message encrypted with the device's public key, which may be included in a DNS record. For the DNS record of a named entity device 130, the public key or certificate may be removed after a predetermined period to allow an ephemeral PKI-based identity. The identity self-management authenticator 240 may authenticate the ephemeral identity. For instance, if a device has a core identity with name 123.edge._device.example.com, with a public key at that record, the third-party server 140 may use that identity to establish ownership of (a) names under that place in DNS, which follows the natural hierarchical organization of the namespace, or (b) a delegated identity which may indicate the core identity by a specifically-formatted record in the namespace. For DNS, this may take the form of a TXT record which indicates the parent identity.

The prior example may allow a device at name 123.edge._device.example.com to establish a short-lived public key credential at serviceclient.123.edge._device.example.com by virtue of the application being configured to allow devices to establish short-lived sub-identities in this fashion. The process of establishing this name-pubkey identity is described in the next example. The difference between this use case and the next may be the method for indicating the authorized parent credential. With this method, it is naturally indicated by the hierarchy of the namespace. In the next, it is deliberately indicated within the namespace or in the application configuration.

The latter example may exist as two DNS records at the name 123.summarizer._device.anotherexample.com. One record is a TXT record which indicates 123.edge._device._example.com as the parent or core identity. The second record at 123.summarizer._device.anotherexample.com may be a TLSA record which contains a public key. The TLSA record at 123.summarizer._device.anotherexample.com is expected to be frequently updated, and if it exceeds its expected lifetime without an update, the record may be removed or 'tombstoned' (having unusable data placed in the record to indicate the identity's existence, but that it should not be trusted). Alternatively, it may make sense for the organization owning anotherexample.com to conceal from publication the parent identity of the device, for privacy reasons (maybe this is a medical device and example.com domain is known for producing a specific type of medical device). In the case where this privacy feature is desired, the third-party server 140 will provide a feature in the management application where the application may correlate the 123.summarizer._device.anotherexample.com device with 123.edge.example.com, for the purpose of authenticating the rotation of the public key.

The process of establishing an ephemeral public key credential at 123.summarizer._device.anotherexample.com may involve the device in possession of the identity as well as the 123.edge._device.example.com to (1) create or obtain a new key pair, (2) create a certificate signing request (CSR) associating the new public key and the 123.summarizer._anotherexample.com name, (3) use the private key associated with the 123.edge._device.example.com identity to generate a cryptographic signature of the CSR and a nonce, and (4) transmit the signature, nonce, and CSR to the third-party server 140.

The third-party server 140 may (1) inspect the CSR and retrieve the name of the proposed identity, (2) determine (either by the TXT record or internal application configuration) that the parent identity for 123.summarizer._device._anotherexample.com is 123.edge._device.example.com, (3) retrieve the public key associated with the 123.edge._device.example.com identity and use that public key to authenticate the CSR, nonce, and signature, and (4) publish the new public key from the CSR, or a certificate containing the same, at the requested name (123.summarizer.anotherexample.com) for a limited time.

The secure software channel management engine 250 may manage the policy for secure software distribution. The secure software channel management engine 250 may correlate subscriber identifiers to universal identities and software channels. The secure software channel management engine 250 may maintain an internal reference of a named entity device's data, such as the device's subscriber identifier, public key, application type, device type, and other information that is associated with the device. The secure software channel management engine 250 may deliver software to various named entity devices 130 in a secure manner. A device may send a query to the third-party server 140 via the query interface 205. In response, the secure software channel management engine 250 may generate the appropriate data payload as a response to the query. The response may be encrypted as discussed above with reference to the query interface 205.

The secure software channel management engine 250 may maintain a database which correlates subscriber identities with channels of software updates. The secure software channel management engine 250 may be analogous to a subscription service where the channel periodically updates the most recent edition of a firmware bundle or configuration file. When the client device indicates its identity to the firmware management service (such as over HTTPS or MQTT) the secure software channel management engine 250 may correlate the device's identity with the appropriate software channel and indicate to the client device the unique identifier of the current version of the software. The unique identifier may be a version tag (v1.0.1) or a computed hash, or some other way of uniquely indicating the current version of the subscription asset. This response may also contain the certificate or public key of the system that built and signed the versioned asset. When the device receives the version indicator (which may be encrypted using the client identity's public key) the device compares the current version of the asset as described by the third-party server 140 with the current version in use on the device. If there is a version mismatch, the device then requests the most recent version of the asset. The third-party server 140 responds to this request by retrieving the signed asset from an artifact repository or a source repository as data payload. The third-party server 140 may encrypt the asset with the public key associated with the requesting device's identity. This may be a direct encryption using a public key, or it may be a key-wrapping approach where a symmetric key is used to encrypt the payload, and the symmetric key is encrypted by the public key. The symmetric key should be randomly-generated for every download to prevent the analysis of multiple asset update actions using the same symmetric key and to prevent the correlation of device capabilities by correlating the metadata associated with the device update process (like the hash of the encrypted payload). When the device receives the update, the device uses its own private key to unpack the update object. The device may use a certificate and signature embedded in the update object or, if provided, the same certificate and signature provided via the initial update request interaction to verify the software download.

The third-party server 140 may be associated with a source configuration management engine and an artifact management engine. Those engines may be version control engines that manage the source code, libraries, library objects, artifacts, and other binary file objects. A source configuration management engine may manage various source code repositories. Example source configuration management engine may manage repositories that are hosted on GITHUB, BITBUCKET, GITLAB, SOURCEFORGE, etc. An artifact management engine may manage the libraries, library objects, artifacts, and other binary file objects. The artifact management engine may automatically fetch updates to various libraries and clean up libraries. The artifact management engine may also tag various libraries and objects with searchable metadata and indexes. An example of an artifact management engine may include services provided by companies such as ARTIFACTORY.

The service management interface 260 may be an interface for an organization administrator to change settings with respect to various engines such as to change message distribution policies associated with the query interface 205, change the authentication policy in the engine 210, to upload credential to the credential escrow management engine 220, define various policies for distribution by the configuration and policy engine 144, etc. The service management interface 260 may include a portal for professional developers, an API, and a user-friendly portal for layman use. For example, the service management interface 260 may provide a user-friendly portal for various organizations to adjust various settings.

The service management interface 260 may take different forms. In one embodiment, the service management interface 260 may control or be in communication with an application that is installed in an administrative device 114. For example, the application may be a cloud-based SaaS or a software application that can be downloaded in an application store (e.g., APPLE APP STORE, ANDROID STORE). The service management interface 260 may be a front-end software application that can be installed, run, and/or displayed at an administrative device 114. The service management interface 260 also may take the form of a webpage interface of the third-party server 140 to allow organization administrators to access data and results through web browsers. In another embodiment, the service management interface 260 may not include graphical elements but may provide other ways to communicate with organization administrators, such as through APIs.

The entropy provider 270 may be a specialized piece of hardware, software, or a combination thereof that produces high-quality randomized bits for various devices, such as certain IoT devices or other named entity devices that may not be equipped with the component to generate high-quality entropy. Randomized bits may be used to create high-quality cryptographic keys. However, truly randomized bits may be difficult to generate using only computational algorithms. The entropy provider 270 may refer to certain real-world randomized events such as physical phenomenon that are expected to be random. The entropy provider 270 may provide entropy to a named entity device 130 for the device 130 to generate cryptographic keys. In some cases, a named entity device may be a provisioning device. The entropy provider 270 may transmit high-quality entropy to the provisioning device. In turn, the provisioning device uses the entropy to generate cryptographic keys and provision a new device (e.g., the configurable device 138) with the keys. The entropy provider 270 may also be used to generate random symmetric keys that are used to encrypt messages and other data payloads transmitted from the query interface 205, whether the data payloads are device updates generated by the secure software channel management engine 250 or other types of message payloads. In some embodiments, the cryptographic keypair may be generated by the third-party server 140, and the provisioning device 134 has a responsibility of securely communicating the keypair to the configurable device 138.

Example Keypair Generation and Distribution Process

Figure 3:
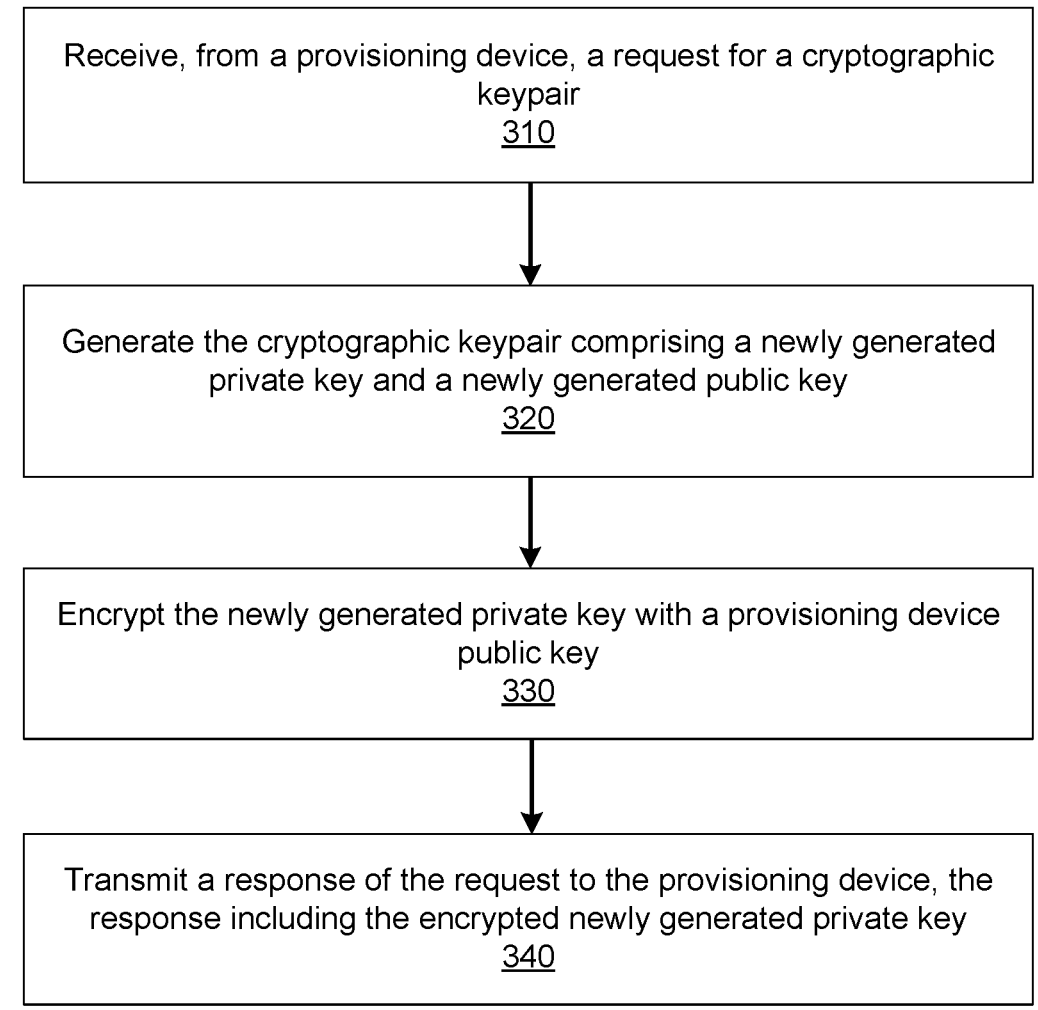
FIG. 3 is a flowchart depicting an example process that illustrates a software algorithm for using a provisioning device to distribute a newly generated private key securely to a new device, in accordance with some embodiments FIGS. 4A, 4B, and 4C, combined, show a flowchart depicting an example identity configuration process that illustrates a software algorithm for the distribution of identity information to a configurable device

FIG. 3 is a flowchart depicting an example process 300 that illustrates a software algorithm for using a provisioning device to distribute a newly generated private key securely to a new device, in accordance with some embodiments. The software algorithm may be stored as computer instructions that are executable by one or more general processors (e.g., CPUs, GPUs). The instructions, when executed by the processors, cause the processors to perform various steps described in the process 300. In various embodiments, one or more steps in the process 300 may be skipped or be changed. The process 300 may be performed by the third-party server 140 or a server of an organization 110. While the process 300 and other processes discussed in this disclosure may be described as being performed by the third-party server 140, these processes may also be performed by other suitable computers. For example, an organization 110 may not delegate the generation of a new keypair to the third-party server 140 for distribution via the provisioning device. Instead, the organization 110 may have a computing server that directly performs the process 300.

A server, such as the third-party server 140, receives 310 a request for a cryptographic keypair in a provisioning session. The request may be transmitted by a provisioning device such as the provisioning device 134 of FIG. 1. In some embodiments, the provisioning device 134 is physically connected to a configurable device 138 such as a new device on which identity (e.g., a private key and a certificate) will be installed. This connection may be performed by an administrator of the organization 110 or automated through, for example, a robotic arm. The request may be transmitted over the networks 190 to the third-party server 140. The third-party server 140 may receive this request at the query interface 205. The request may be associated with the bootstrapping of the configurable device 138.

To enhance the security of the process 300, the request may be encrypted or may include the digital signature of the provisioning device 134. The provisioning device 134 may retrieve the public key of the third-party server 140 and encrypt the request. The transmitted request may include an identifier associated with the provisioning device 134 and a digital signature that is signed by the provisioning device 134 using the private key of the provisioning device 134. The third-party server 140 may authenticate the request using the public key of the provisioning device 134 and decrypt the encrypted content using the private key of the server 140. In some embodiments, the request includes a session token retrieved from a namespace server 112, such as a DNS. The session token may be time-bound and indicate the identity record of the provisioning device 134.

The third-party server 140 generates 320 the cryptographic keypair that includes a newly generated private key and a newly generated public key. The third-party server 140 may generate the cryptographic keypair using the entropy provider 270, which generates high quality cryptographic keypairs. By leveraging the entropy provider 270 of the third-party server 140 rather than configuring each provisioning device 134 with specialized entropy provider hardware, which may be costly and require many computing cycles at the provisioning device 134 due to the complex processing needed of high quality entropy generation, the process 300 allows for a provisioning device 134 that may operate sufficiently with commonly available hardware, without high power consumption and complicated processing requirements and thus, cost-efficient for named entities wanting to secure the information communicated between their devices. The third-party server 140 may provide the provisioning sessions to various organizations 110 as software as a service (SaaS) that specializes in generating high quality cryptographic keypairs. By performing the keypair generation and provisioning the generated keypairs, the third-party server 140 may reduce a number of potential attacks to the system environment 100 by reducing the number of potential targets for the attacks. That is, by locating keypair generation at the third-party server 140, or any suitable colocation environment, rather than within, for example, the provisioning devices 134, malicious actors are less likely to target the provisioning devices 134. Accordingly, security standards outlined in the National Institute of Standards and Technology (NIST) publication 800-53, FedRAMP, and other compliance frameworks are more easily satisfied.

The third-party server 140 may also verify the identity record of the provisioning device 134. For example, the request for the cryptographic keypair may include the session token and a digital signature of the provisioning device 134. The third-party server 140 may examine the session token to determine whether the token is valid and unexpired. The session token may include the identity address of the provisioning device 134, such as a DNS address. Based on the identity address, the third-party server 140 retrieves the public key of the provisioning device 134 that is stored at the address of a namespace server. The third-party server 140 uses the public key of the provisioning device 134. To distinguish various public-private keypairs discussed in the process 300, the public key of the provisioning device 134 may be referred to as the "provisioning device public key,"

the public key of the third-party server 140 may be referred to as the "third-party server public key," and so forth.

Upon verifying the identity record of the provisioning device, the third-party server 140 encrypts 330 the newly generated private key with the provisioning device public key. In this way, the newly generated private key designated for the configurable device 138 may be securely transmitted. For example, the encrypted newly generated private key is transmitted over the networks 190 to the provisioning device 134 and an intruding device eavesdropping on information sent over the networks 190 cannot steal the newly generated private key for malicious use. In addition to an encrypted private key, the third-party server 140 may also generate a certificate including a public key for the configurable device 138, which is described in more detail with respect to the description of FIGS. 4A, 4B, and 4C.

The third-party server 140 transmits 340 a response of the request to the provisioning device 134. The response may include the encrypted, newly generated private key of the configurable device 138. In some embodiments, the response may further include other data such as the newly generated public key of the configurable device 138 or the certificate generated by the third-party server 140. The provisioning device 134 receives and decrypts the encrypted, newly generated private key of the configurable device 138 using the provisioning device private key. The provisioning device 134, physically connected to the configurable device 138, may then install the decrypted private key on to the configurable device 138. In some embodiments, the third-party server 140 also transmits, in the response, a certificate of the configurable device 138 that is also encrypted with the provisioning device's public key. The provisioning device 134 may similarly decrypt this certificate and install it on to the configurable device 138.

In some embodiments, the newly provisioned configurable device 138 has an identity record on a public database such as the namespace server 112. For example, the identity record may include the newly generated public key of the configurable device 138 stored in a TXT record in the DNS at an address designated for the newly generated public key. For example, the configurable device 138 may be manufactured and provisioned by an organization 110, whose namespace (e.g., DNS) contains identity records of various named entity devices 130 that are associated with the organization 110. The organization 110 may delegate part of the namespace to the third-party server 140 as the delegated namespace zone 142. In the delegated namespace zone 142, the third-party server 140 may create a sub-namepsace for the newly provisioned configurable device 138 and store the newly generated public key in the sub-namespace. Alternative to or in addition to storing the newly generated pubic key at an address corresponding to the identity record of the newly provisioned configurable device 138, the third-party server 140 may also store the certificate at the address. The certificate includes the newly generated public key and is signed by the third-party server 140. Any parties may visit the address and use the third-party server public key to verify the certificate and the configurable device public key.

To further enhance the security, the distribution of the newly generated keypair may be accessible through the use of a time-bound session token. The provisioning device 134 may retrieve, from the namespace server 112 or the delegated namespace zone 142, an encrypted time-bound session token after authenticating itself to the third-party server 140. The session token may indicate a set of credentials that the holder of the token has to receive the newly generated keypair. After a certain period of time has passed (e.g., two minutes) or once the generated keypair has been accessed, the credentials of the session token may expire and the third-party server 140 may be unable to fulfill the provisioning device 134's request for a cryptographic keypair. For example, after a threshold amount of time has passed since the session token was generated, the credentials of the session token expire and the newly generated keypair will not be provided to a device holding the expired session token. In the event that the provisioning device 134 is compromised, the time-bound session token may afford the organization 110 time (e.g., the time between requesting a session tokens) to remove the provisioning device 134 from a policy where it is authorized to distribute keypairs. Additionally or alternatively, to further enhance security, the provisioning device 134 may authenticate itself to the third-party server 140 using public key-based authentication or any suitable method for API authentication.

Example Identity Configuration Process

Figure 4A:
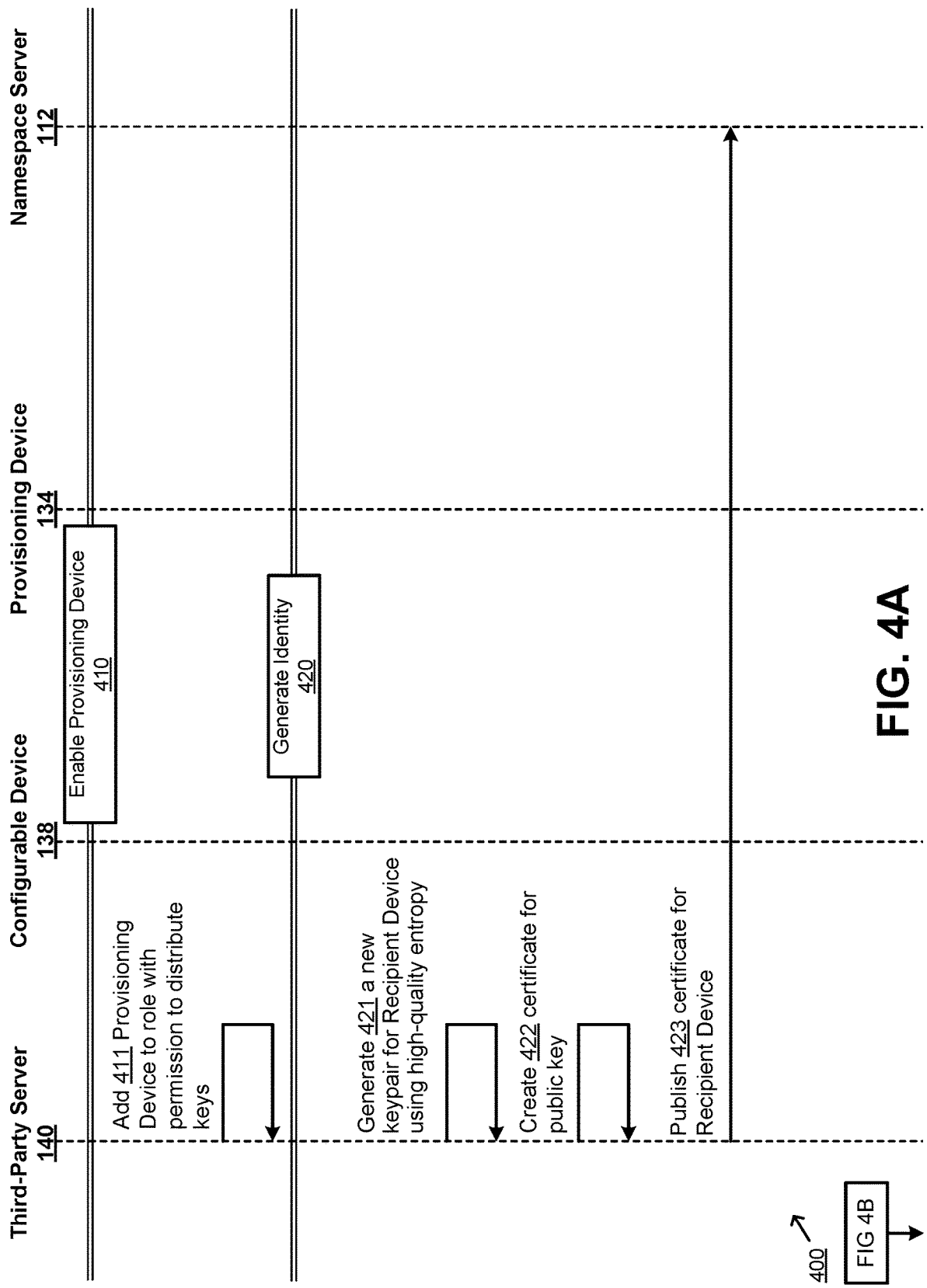
Figure 4B:
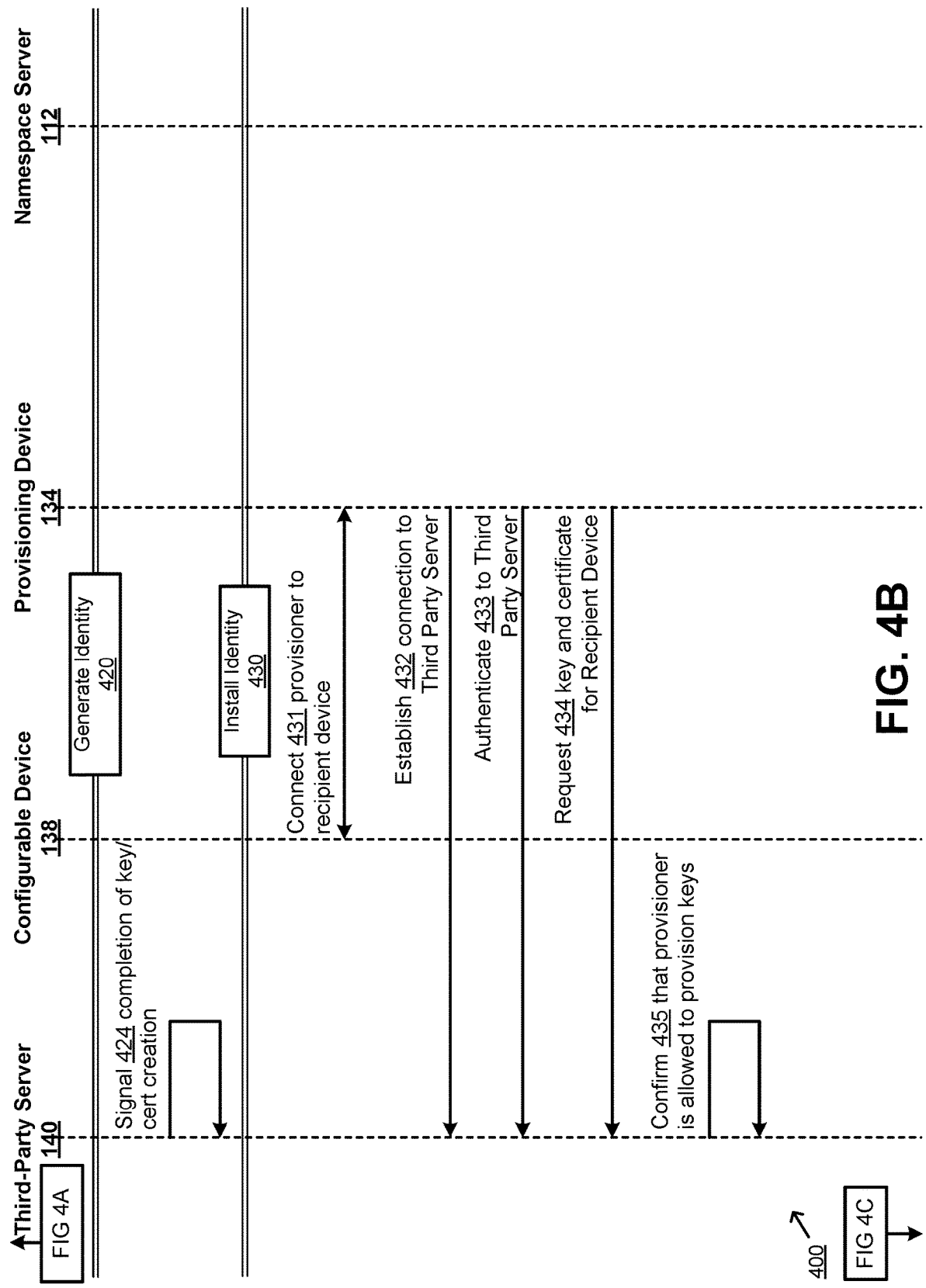

FIGS. 4A, 4B, and 4C, combined, show a flowchart depicting an example identity configuration process 400 that illustrates a software algorithm for the distribution of identity information to a configurable device. The software algorithm may be stored as computer instructions that are executable by one or more general processors (e.g., CPUs, GPUs). The instructions, when executed by the processors, cause the processors in different devices to perform various steps described in the process 400. The process 400 may be performed by a third-party server 140, a configurable device 138, a provisioning device 134, and a namespace server 112. The process 400 may be an example of the process 300.

The process 400 includes three phases: a phase 410 to enable a provisioning device, a phase 420 to generate an identity, and a phase 430 to install the identity. The process 400 may be used to configure an identity to a configurable device 138 that has not previously had an identity or to rotate an expired identity with a new identity. In various embodiments, one or more steps in the process 400 may be skipped or be changed. For example, the phase 420 to generate the identity may happen prior to the phase 410 to enable the provisioning device.

During the provisioning device enablement phase 410, the third-party server 140 adds 411 the provisioning device 134 to a role with permission to distribute keys. For example, the third-party server 140 maintains, in the configuration and policy engine 144, a policy that includes a list of provisioning devices authorized to provision keys for configuring the identity of new devices or rotating the expired identity information of existing named entity devices. In this way, the third-party server 140 may verify the identity record of the provisioning device 134 and determine, based on a policy in the engine 144, whether the provisioning device 134 is authorized to receive and transmit a newly generated key and/or certificate to a configurable device 138. The provisioning device may be used in the identity installation phase 430 for one or more new devices.

Although not depicted, during the provisioning device enablement phase 410, the third-party server 140 may receive a request to configure the provisioning device 134 prior to adding 411 the provisioning device 134 to the role. The third-party server 140 may receive this request at the query interface 205. The request may be from an authorized device such as from the named entity device 130 configuring new devices. The request may include identifying information about the provisioning device 134 such as a universally unique identifier (UUID), media access control (MAC) address, or serial number of the user device. This identifying information may be stored in a record associated with the provisioning device 134 in the configuration and policy engine 144 to identify the provisioning device 134 or query for policies associated with it.

During the identity generation phase 420, the third-party server 140 generates a keypair and certificate for the configurable device 138. While not depicted, the phase 420 may begin with the third-party server 140 receiving a request to configure the identity of the configurable device 138. This identity configuration request may be received from the provisioning device 134 or the named entity device 130. This request may be received at the query interface 205 of the third-party server 140 and cause the third-party server 140 to use the entropy provider 270 to generate 421 the new keypair for the configurable device 138. The third-party server 140 uses high-quality entropy to generate 421 this keypair.

The third-party server 140 then creates 422 a certificate for the public key of the generated keypair. The certificate may include the newly generated public key for the configurable device 138 and the third-party server's digital signature that encrypts the newly generated public key. Any party may use the third-party server pubic key to decrypt the digital signature and verify the newly generated public key. The third-party server 140 publishes 423 the certificate for the configurable device 138. For example, the third-party server 140 may transmit the certificate to the namespace server 112. The namespace server 112 may store the certificate in a record associated with the configurable device 138. This record may have an address corresponding to the identity record of the configurable device 138 and may be accessed for subsequent requests to authenticate communication from the configurable device 138 bearing a signature created with the private key of the configurable device 138. As referred to herein, the configurable device 138 may be a "newly provisioned named entity device" when the newly generated private key and/or certificate has been installed on the configurable device 138. The third-party server 140 signals 424 the completion of the keypair and certificate creation. For example, the credential escrow management engine 220 may transmit a message to the query interface 205 that the keypair and certificate have been created.

During the identity installation phase 430, the provisioning device 134 is physically connected 431 to the configurable device 138. The configurable device 138 and the provisioning device 134 may have physical interfaces configured to couple to one another and allow for the communication of data between the devices. For example, an administrator of the named entity associated with the named entity device 130 couples a USB connector of the provisioning device 134 to a corresponding USB port of the configurable device 138.

Once the provisioning device 134 has physically connected with the configurable device 138, the provisioning device 134 may establish 432 a connection (e.g., wireless connection over the networks 190) with the third-party server 140 to receive the generated keypair from the third-party server 140 and distribute the keypair to the configurable device 138. For example, the network interface of the provisioning device 134 may connect with the query interface 205 of the third-party server 140.

The provisioning device 134 then authenticates 433 itself to the third-party server 140 (e.g., using a digital signature made with its private key). The provisioning device 134 requests 434 the generated private key and certificate for the configurable device 138. In some embodiments, a provisioning application at the provisioning device 134 may send this request to the query interface 205 of the third-party server 140. In response to receiving the request, the third-party server 140 confirms 435 that the provisioning device 134 is allowed to provision keys. For example, the query interface 205 confirms with the configuration and policy engine 144 that the provisioning device 134 has been added 411 to the role with permission to distribute keys to new devices.

With the confirmation 435 completed, the third-party server 140 requests 436 a bundle of the private key and certificate for the configurable device 138. For example, the query interface 205 may send a request to the credential escrow management engine 220 of the third-party server 140. To provide the private key and certificate for the configurable device 138, the engine 220 retrieves 437 the public key of the provisioning device 134 from the namespace server 112, which is used to secure the bundle for the configurable device 138 as it is communicated from the third-party server 140 to the provisioning device 134. The third-party server 140 may retrieve 438 the private key and the certificate of the configurable device 138 from the engine 220. The engine 220 uses the public key of the provisioning device 134 to encrypt 439 the private key and certificate of the configurable device 138.

The third-party server 140 then transmits 440 the encrypted bundle to the provisioning device 134. For example, the third-party server 140 may transmit 440 the encrypted key and certificate to the provisioning device 134. To complete the installation identity phase 430, the provisioning device 134 decrypts 441 the received encrypted private key and certificate of the configurable device 138 using its private key. The provisioning device 134 then installs 442 the decrypted private key and certificate into the configurable device 138 (e.g., using a secured USB connection).

Computing Machine Architecture

FIG. 5 is a block diagram illustrating components of an example computing machine that is capable of reading instructions from a computer-readable medium and executes them in a processor (or controller). A computer described herein may include a single computing machine shown in FIG. 5, a virtual machine, a distributed computing system that includes multiple nodes of computing machines shown in FIG. 5, or any other suitable arrangement of computing devices.

By way of example, FIG. 5 shows a diagrammatic representation of a computing machine in the example form of a computer system 500 within which instructions 524 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 5 may correspond to any software, hardware, or combined components shown in various figures, such as various servers and devices shown in FIG. 1, various engines and modules shown in FIG. 2. While FIG. 5 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 524 that specify actions to be taken by that machine. Further, while only a single machine is illustrated, the term "machine" and "computer" may also be taken to include any collection of machines that individually or jointly execute instructions 524 to perform any one or more of the methodologies discussed herein.

The example computer system 500 includes one or more processors 502 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 500 may also include a memory 504 that stores computer code including instructions 524 that may cause the processors 502 to perform certain actions when the instructions are executed, directly or indirectly by the processors 502. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 502 and reduces the space required for the memory 504. For example, the machine learning methods described herein reduces the complexity of the computation of the processors 502 by applying one or more novel techniques that simplify the steps in training, reaching convergence, and generating results of the processors 502. The algorithms described herein also reduces the size of the models and datasets to reduce the storage space requirement for memory 504.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though the specification or the claims may refer to some processes to be performed by a processor, this should be construed to include a joint operation of multiple distributed processors.

The computer system 500 may include a main memory 504, and a static memory 506, which are configured to communicate with each other via a bus 508. The computer system 500 may further include a graphics display unit 510 (e.g., a plasma display panel (PDP), a liquid crystal display (LCD), a projector, or a cathode ray tube (CRT)). The graphics display unit 510, controlled by the processors 502, displays a graphical user interface (GUI) to display one or more results and data generated by the processes described herein. The computer system 500 may also include an alphanumeric input device 512 (e.g., a keyboard), a cursor control device 514 (e.g., a mouse, a trackball, a joystick, a motion sensor, or another pointing instrument), a storage unit 516 (a hard drive, a solid state drive, a hybrid drive, a memory disk, etc.), a signal generation device 518 (e.g., a speaker), and a network interface device 520, which also are configured to communicate via the bus 508.

The storage unit 516 includes a computer-readable medium 522 on which is stored instructions 524 embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting computer-readable media. The instructions 524 may be transmitted or received over a network 526 via the network interface device 520.

While computer-readable medium 522 is shown in an example embodiment to be a single medium, the term "computer-readable medium" should be taken to include a single medium or multiple media (e.g., a centralized or distributed database, or associated caches and servers) able to store instructions (e.g., instructions 524). The computer-readable medium may include any medium that is capable of storing instructions (e.g., instructions 524) for execution by the processors (e.g., processors 502) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

Using a third-party server 140 to distribute keypairs generated with high quality entropy has various benefits over non-central, locally provided entropy. An advantage to having centralized entropy generation on the third-party server 140 is eliminating cost of having an entropy generator on each configurable device that needs new or updated identity. The cost may be described in terms of hardware space, power consumption, computing bandwidth, and monetary cost. Specialized hardware for generating high quality entropy can require a large amount of power and computation bandwidth, and can be very expensive due to its specialized function. For example, for devices with small form factors, such as wearables or other devices in an IoT environment, low power operation and space savings are critical. Furthermore, implementing policies at the third-party server 140 involving time-bound session tokens enhances the security of the identity distribution services described herein when a provisioning device is compromised. The time between the beginning of one session and the next is time that an organization may be afforded to flag the provisioning device as compromised and prevent it from accessing newly generated cryptographic keypairs.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:
   receiving, by a third-party server and from a provisioning device physically connected to a configurable device, a request for a cryptographic keypair, the request indicative of an identity record of the provisioning device;
   generating the cryptographic keypair, the cryptographic keypair comprising a private key and a public key, the cryptographic keypair generated in response to the request;
   verifying the identity record of the provisioning device;
   encrypting the private key with a provisioning device public key to generate an encrypted private key, the provisioning device public key corresponding to a provisioning device private key held by the provisioning device; and
   transmitting a response of the request to the provisioning device, the response comprising the encrypted private key for the provisioning device to decrypt using the provisioning device private key and to transfer the private key to the configurable device to generate a provisioned named entity device, the provisioned named entity device associated with an identity record comprising the public key hosted at a namespace server.

2. The computer-implemented method of claim 1, further comprising transmitting the public key to the namespace server for the namespace server to host the public key at an address corresponding to the identity record of the provisioned named entity device.

3. The computer-implemented method of claim 2, further comprising:
   generating a certificate comprising the public key; and
   transmitting the certificate to the namespace server.

4. The computer-implemented method of claim 3, wherein the provisioning device transfers the certificate with the private key to the configurable device to generate the provisioned named entity device.

5. The computer-implemented method of claim 1, wherein the provisioning device includes a security token or a smart card configured to store the identity record of the provisioning device.

6. The computer-implemented method of claim 1, wherein the third-party server comprises one or more entropy-generating processors configured to generate cryptographic keypairs.

7. The computer-implemented method of claim 1, further comprising:
   verifying the identity record of the provisioning device; and
   determining, based on a policy, that the provisioning device is authorized to receive the cryptographic keypair, the policy indicating one or more rules applied to the provisioning device to receive cryptographic keypairs.

8. The computer-implemented method of claim 1, further comprising assigning a policy to the provisioning device to enroll the provisioning device with the third-party server, wherein one or more rules of assigned policies are applied to enrolled provisioning devices for the enrolled provisioning devices to receive cryptographic keypairs from the third-party server.

9. The computer-implemented method of claim 1, wherein the private key replaces a previously generated private key on the configurable device and the public key replaces a previously generated public key on the namespace server.

10. The computer-implemented method of claim 1, wherein the request includes a session token indicating the identity record of the provisioning device, and wherein the third-party server is unable to fulfill the request for the cryptographic keypair after a threshold amount of time has passed since the session token is generated.

11. A system comprising:
one or more processors; and
memory configured to store instructions, the instructions, when executed by the one or more processors, cause the one or more processors to:
receive, from a provisioning device physically connected to a configurable device, a request for a cryptographic keypair, the request indicative of an identity record of the provisioning device;
generate the cryptographic keypair, the cryptographic keypair comprising a private key and a public key, the cryptographic keypair generated in response to the request;
verify the identity record of the provisioning device;
encrypt the private key with a provisioning device public key to generate an encrypted private key, the provisioning device public key corresponding to a provisioning device private key held by the provisioning device; and
transmit a response of the request to the provisioning device, the response comprising the encrypted private key for the provisioning device to decrypt using the provisioning device private key and to transfer the private key to the configurable device to generate a provisioned named entity device, the provisioned named entity device associated with an identity record comprising the public key hosted at a namespace server.

12. The system of claim 11, wherein the instructions, when executed by the one or more processors, further cause the one or more processors to transmit the public key to the namespace server for the namespace server to host the public key at an address corresponding to the identity record of the provisioned named entity device.

13. The system of claim 11, wherein the provisioning device includes a security token or a smart card configured to store the identity record of the provisioning device.

14. The system of claim 11, wherein the system is included in a third-party server, and the third-party server comprises one or more entropy-generating processors configured to generate cryptographic keypairs.

15. The system of claim 11, wherein the instructions, when executed by the one or more processors, further cause the one or more processors to:
verify the identity record of the provisioning device; and
determine, based on a policy, that the provisioning device is authorized to receive the cryptographic keypair, the policy indicating one or more rules applied to the provisioning device to receive cryptographic keypairs.

16. A non-transitory computer readable storage medium configured to store computer code comprising instructions, the instructions, when executed by one or more processors, cause the one or more processors to:
receive, from a provisioning device physically connected to a configurable device, a request for a cryptographic keypair, the request indicative of an identity record of the provisioning device;
generate the cryptographic keypair, the cryptographic keypair comprising a private key and a public key, the cryptographic keypair generated in response to the request;
verify the identity record of the provisioning device;
encrypt the private key with a provisioning device public key to generate an encrypted private key, the provisioning device public key corresponding to a provisioning device private key held by the provisioning device; and
transmit a response of the request to the provisioning device, the response comprising the encrypted private key for the provisioning device to decrypt using the provisioning device private key and to transfer the private key to the configurable device to generate a provisioned named entity device, the provisioned named entity device associated with an identity record comprising the public key hosted at a namespace server.

17. The non-transitory computer readable storage medium of claim 16, wherein the instructions, when executed by the one or more processors, further cause the one or more processors to transmit the public key to the namespace server for the namespace server to host the public key at an address corresponding to the identity record of the provisioned named entity device.

18. The non-transitory computer readable storage medium of claim 16, wherein the provisioning device includes a security token or a smart card configured to store the identity record of the provisioning device.

19. The non-transitory computer readable storage medium of claim 16, wherein the request for a cryptographic keypair is received by a third-party server, and the third-party server comprises one or more entropy-generating processors configured to generate cryptographic keypairs.

20. The non-transitory computer readable storage medium of claim 16, wherein the instructions, when executed by the one or more processors, further cause the one or more processors to:
verify the identity record of the provisioning device; and
determine, based on a policy, that the provisioning device is authorized to receive the cryptographic keypair, the policy indicating one or more rules applied to the provisioning device to receive cryptographic keypairs.

* * * * *